United States Patent

[11] 3,609,319

| [72] | Inventors | William Clifford, Jr.<br>Middletown;<br>John G. Demko, New Shrewsbury; William K. Kindle, West Long Branch, all of N.J. |
|---|---|---|
| [21] | Appl. No. | 789,632 |
| [22] | Filed | Dec. 3, 1968 |
| [45] | Patented | Sept. 28, 1971 |
| [73] | Assignee | Electronic Associates, Inc.<br>Long Branch, N.J.<br>Continuation-in-part of application Ser. No. 725,418, Apr. 30, 1968, now abandoned. |

[54] DIGITAL PLOTTER IN WHICH PLOTTING SPEED IS OPTIMIZED IN TERMS OF A CURVE-FITTING TECHNIQUE
10 Claims, 16 Drawing Figs.

[52] U.S. Cl. .................................................. 235/151.11,
    318/573, 340/172.5
[51] Int. Cl. ...................................................... G06b 15/46
[50] Field of Search .......................................... 235/151,
    151.1, 151.11; 346/29, 34; 340/172.5;
    318/20.105, 20.108, 20.130

[56] References Cited
UNITED STATES PATENTS

| 3,227,864 | 1/1966 | Kadoguchi | 235/151.11 |
|---|---|---|---|
| 3,293,651 | 12/1966 | Gerber et al. | 235/151 X |
| 3,328,655 | 6/1967 | Tripp | 318/20.130 X |
| 3,449,554 | 6/1969 | Kelling | 235/151.11 |
| 3,486,012 | 12/1969 | Burnett et al. | 235/151 X |

OTHER REFERENCES

Control Engineering– Jan. 1961– " New Continuous Path System Uses ADA Interpolator"– Henegar– pg. 71– 76 (Copy available in group 236–class 235/150.31)

*Primary Examiner*—Malcolm A. Morrison
*Assistant Examiner*—Joseph F. Ruggiero
*Attorneys*—Edward A. Petko and Robert M. Skolnik ABSTRACT: Plotting of digital data is accomplished by optimizing plotting speed in terms of a curve-fitting technique. Segments of a curve whose $x$ and $y$ end points are specified, are defined in terms of a set of parametric equations represented by third order polynomials with distance as the independent variable. The curvature of these segments is then developed. Optimum plotting speed is then determined considering the requisite degree of curvature and the physical limitations of the plotter such as arm and pen mass and motor torque. This optimum plotting speed determines the rate of generation of the parametric equations in $x$ and $y$ and drives the system through a hybrid servosystem for the independent variable distance. Thus, the plotter is driven to the desired data points with a geometry independent of velocity.

DIGITAL PLOTTER IN WHICH PLOTTING SPEED IS OPTIMIZED IN TERMS OF A CURVE-FITTING TECHNIQUE

This application is a continuation-in-part of copending application Ser. No. 725,418 filed Apr. 30, 1968, now abandoned.

The present invention relates to a system for obtaining graphical plots of digital data representing lines or curves.

Interpretation of the output of a digital computer when used for solution of scientific problems has been an area of much activity in recent years. Solutions from a digital computer consist generally of a series of numerical designations requiring detailed and time-consuming interpretation. It would be very desirable to obtain a visual display of the solution indicated by these numerical designations without the necessity for skilled interpretation.

U.S. Pat. No. 3,199,111 to Jennings et al. represents a prior art system which produces a graphical plot of digital data. This system comprises essentially an incrementally movable plotting instrument controlled by a plurality of stepping motors. The motors are stepped by the digital signals representing the function to be plotted.

One disadvantage in the above-described prior art plotter is the lack of a smooth and continuous plot. This disadvantage arises from the stepwise or discontinuous nature of the plotting system. The resultant plot has the appearance of a plurality of sequential steps defining the desired configuration.

Another disadvantage of the above-described incremental plotter system is that it possesses constant speed. For many applications, such as line plotting or curve plotting where the degree of curvature is not great, greater plotting speed can be utilized enabling expeditious plotting of the particular input data.

The present plotting system eliminates the first of the above disadvantages by provision of a continuous plotter drive mechanism consisting of a hybrid servosystem which digitally compares the desired incremental position signals with the incremental present position signals to generate a digital error signal. This error signal is converted to analog form and is used to drive the $x$ and $y$ positioning motor.

The second disadvantage above is overcome by relating present plotter velocity to a command or desired plotter velocity. The command velocity is computed based upon the degree of curvature to be encountered and the acceleration limits of the plotter mechanism. This command velocity is thus optimized as the best plotting speed for the system capability and the requirements of the data.

It is, therefore, an object of the present invention to provide a continuous graphical plot of digital data.

Another object of the present invention is the generation of a graphical plot of digital data at a plotting speed which is optimized based on the degree of curvature of the data and the system acceleration capability.

These as well as further objects of the invention will become apparent from a reading of the following specification which refers to the accompanying drawings in which.

In brief, the data to be plotted is obtained in digital form from the output of a digital computer. This output data may be termed a series of data points. The degree of curvature between data points is generated. Optimum plotter velocity for this curvature is developed taking into account the physical limitations on speed and acceleration imposed by the mass of the plotting structure to be moved and by the torque output of the motors available to drive the plotting structure. The optimum velocity thus determined is compared with the actual plotter velocity and an accelerate or decelerate command is generated.

The segments between the data points are approximated by a third order polynomial curve-fitting technique. Third order polynomials for the data points in $x$ and $y$ are thus generated with distance as the independent variable. This distance between data points is also computed. The geometry of the segments is thus determined and is plotted by solving the third order polynominals at a rate determined by the accelerate or decelerate commands generated by the optimized velocity function.

THEORY OF OPERATION

Figure 1:
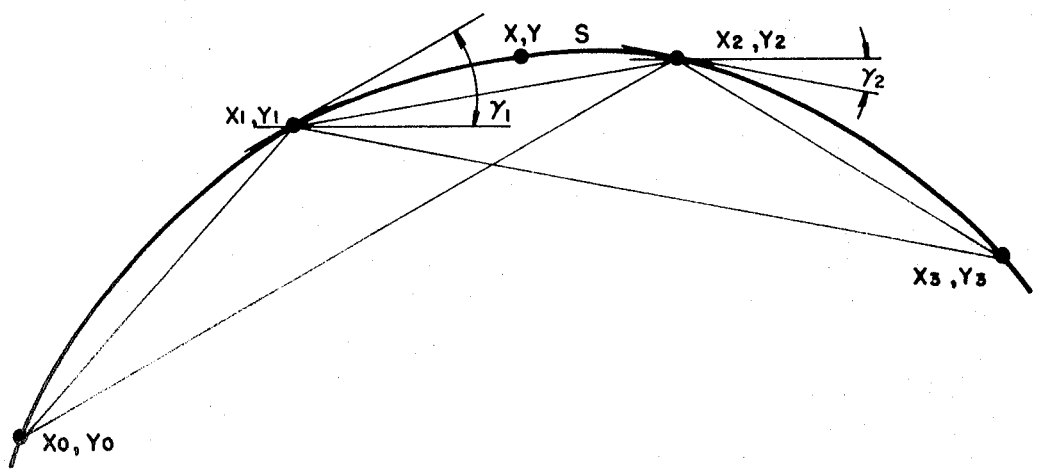
FIG. 1 is a diagram of a typical curve showing parameters of the curve necessary to the present invention.

In FIG. 1, the digital data points to be plotted are represented by points $x_0, y_0$; $x_1, y_1$; $x_2, y_2$; and $x_3, y_3$ on a curve. The present invention employs an interpolation curve-fitting technique to drive the plotter pen for the curvilinear distance between data points.

The following third order polynomials define the segments of the curve between data points:

(1) $x = x_1 + a_x z + \frac{1}{2} b_x z^2 + \frac{1}{6} c_x z^3$ (2) $y = y_1 + a_y z + \frac{1}{2} b_y z^2 + \frac{1}{6} c_y z^3$ The variable $z$ is a dummy variable, having the dimension of length, and is used to define the parametric equations in $x$ and $y$. The coefficients $a_x, b_x, c_x$ and $a_y, b_y,$ and $c_y$ are constant for the curve segment generated between two data points.

By definition (3) $(ds)^2 = (dx)^2 + (dy)^2$ where $s$ = actual distance along the segment; and $x$ and $y$ = distance along the abscissa and ordinate, respectively.

By defining the relationship between $s$, $x$ and $y$ as in equation (3), it is clear that:

(4) $(ds/dz)^2 = (dx/dz)^2 + (dy/dz)^2$ and (5) $ds/dz$ $(a_x + b_x z + \frac{1}{2} c_x z^2)^2 + (a_y + b_y z + \frac{1}{2} c_y z^2)^2$ (4) $(ds/\text{intergerized } 2 = (dx/dz)^2 + (dy/dz)^2$ and (5) $(ds/dz) = \sqrt{(a_x + b_x z + \frac{1}{2} c_x z^2)^2 + (a_y + b_y z + \frac{1}{2} c_y z^2)^2}$ A set of constraints are imposed on the characteristics of the curve to define the curve between the data points. These constraints determine the value of the constants $a_x, b_x, c_x,$ and $a_y, b_y,$ and $c_y$. The constraints are chosen such that:

1. The interpolating curve passes exactly through the data points such as $x_1, y_1,$ and $x_2, y_2$;
2. The interpolating curve has slopes at the beginning point and end point exactly equal to the slope of chords drawn between the preceding and succeeding data points;
3. The derivative $dz/ds$ of the dummy variable $z$ with respect to distance along the path $s$, is equal to unity at both ends of the curve (i.e. at $x_1, y_1$ and $x_2, y_2$) and in the middle of the curve (i.e. at $z = z_2/2$ where $z_2$ is the value of $z$ at the point $x_2, y_2$). This is selected to permit $dz/dt$ to be approximated by $ds/dt$ and to limit the variation in curvature in the segment.

The constraints are expressed mathematically as follows:

(6) $x = x_2$ at $z = z_2$ (7) $y = y_2$ at $z = z_2$ (8) $\left.\dfrac{dy}{dx}\right|_1 = \tan \gamma_1 = \dfrac{y_2 - y_0}{x_2 - x_0}$ (9) $\left.\dfrac{dy}{dx}\right|_2 = \tan \gamma_2 = \dfrac{y_3 - y_1}{x_3 - x_1}$

(10) $\left.\dfrac{dz}{ds}\right|_{z=0} = 1$

(11) $\left.\dfrac{dz}{ds}\right|_{z=z_2} = 1$

(12) $\left.\dfrac{dz}{ds}\right|_{z=\frac{z_2}{2}} = 1$

Constraints 6 and 7 make the curve pass through data points $x_2, y_2,$ (the form of equations (1) and (2) make the curve pass through $x_1, y_1$ at $z = 0$). Constraints 8 and 9 make the slope of the curve at the beginning and end point exactly equal to the slope of the chords as described in paragraph 2, above. Constraints 10–12 make the rate of change of $z$ with respect to $s$ equal to unity at the beginning, end, and middle of the segment.

In order to implement the curve-fitting technique, solutions for the following seven quantities must be developed: $z_x$, $a_y$, $b_x$, $b_y$, $c_x$, $c_y$, and $z_2$ (the value of $z$ at the end of the segment).

The following seven equations are solved for these quantities:

(13) $\quad \left.\dfrac{dx}{dz}\right|_0 = a_x = \cos \gamma_1$

(14) $\quad \left.\dfrac{dy}{dz}\right|_0 = a_y = \sin \gamma_1$

(15) at $z=z_2$ $\quad x_2 = x_1 + a_x z_2 + \tfrac{1}{2} b_x z_2^2 + 1/6 c_x z_2^3$

(16) at $z=z_2$ $\quad y_2 = y_1 + a_y z_2 + \tfrac{1}{2} b_y z_2^2 + 1/6 c_y z_2^3$

(17) $\quad \left.\dfrac{dx}{dz}\right|_{z_2} = a_x + b_x z_2 + \tfrac{1}{2} c_x z_2^2 = \cos \gamma_2$

(18) $\quad \left.\dfrac{dy}{dz}\right|_{z_2} = a_y + b_y z_2 + \tfrac{1}{2} c_y z_2^2 = \sin \gamma_2$ (18.5) $[a_x+b_x(z_2/2)+1/2c_x(z_2/2)^2]^2+[a_y+b_y(z_2/2)+1/2c_y(z_2/2)^2]a0=1$ (i.e. $ds/dz=1$ at $z=z_2/2$)

Equations (15) and (16) are modified versions of equations (1) and (2) at $z=z_2$. Equations (13) and (14) are derived as follows:

(19) $\sin\gamma_1 = dy/dz$ at $z=0$
(20) $\cos\gamma_1 = dx/dz$ at $z=0$
(21) $\cos\gamma_2 = dx/dz = a_x + b_x z + \tfrac{1}{2} c_x z^2$
(22) $\sin\gamma_2 = dy/dz = a_y + b_y z + \tfrac{1}{2} c_y z^2$ Letting $z=0$
(23) $\cos\gamma_1 = a_x$, and
(24) $\sin\gamma_1 = a_y$ Equations (17) and (18) are derived in the same manner as equations (15) and (16); however, $z=z_2$.

Solution of these equations simultaneously in terms of $z$ with the constraints imposed yields:

(25) $a_x = \cos\gamma_1$
(26) $a_y = \sin\gamma_1$

(27) $\quad b_x = \dfrac{2}{z_2}\left[3\left(\dfrac{x_2-x_1}{z_2}\right) - \cos\gamma_2 - 2\cos\gamma_1\right]$

(28) $\quad b_y = \dfrac{2}{z_2}\left[3\left(\dfrac{y_2-y_1}{z_2}\right) - \sin\gamma_2 - 2\sin\gamma_1\right]$

(29) $\quad c_x = \dfrac{6}{z_2^2}\left[\cos\gamma_2 + \cos\gamma_1 - 2\left(\dfrac{x_2-x_1}{z_2}\right)\right]$

(30) $\quad c_y = \dfrac{6}{z_2^2}\left[\sin\gamma_2 + \sin\gamma_1 - 2\left(\dfrac{y_2-y_1}{z_2}\right)\right]$ To solve for $z$ consider the derivative which can be expanded to:

(31) $(ds/dz)^2 = (dx/dz)^2 + (dy/dz)^2$ Which can be expanded to

(32)
$$\left.\dfrac{ds^2}{dz}\right|_{\frac{z_2}{2}} = \dfrac{1}{8}\left\{\dfrac{18}{z_2^2}[(x_2-x_1)^2 + (y_2-y_1)^2]\right.$$
$$-\dfrac{6}{z_2}[(x_2-x_1)(\cos\gamma_1+\cos\gamma_2)$$
$$\left.+(y_2-y_1)(\sin\gamma_1+\sin\gamma_2)]+1+\cos(\gamma_2-\gamma_1)\right\}=1$$

Note the evaluation of the above equations at $z_2/2$
Thus,
(33) $z_2^2[7-\cos(\gamma_2-\gamma_1)]+6z[(x_2-x_1)(\cos\gamma_1+\cos\gamma_2)+(y_2-y_1)(\sin\gamma_1+\sin\gamma_2)]-18[(x_2-x_1)^2+(y_2-y_1)^2]=0$
(34) and $z_2=(1/a)[-(b/2)+\sqrt{(b/2)^2-ac}]$
where
(35) $aax7-\cos(\gamma_2-\gamma_1)$
(36) $(b/2)=3[(x_2-x_1)(\cos\gamma_1+\cos\gamma_2)+(y_2-y_1)(\sin\gamma_1+\sin\gamma_2)]a0$
(37) $cax-18[(x_2-x_1)^2+(y_2-y_1)^2]$ Computation of the angles $\gamma$ requires a preceding point and a succeeding point for each line segment. As the beginning angle of the curve $\gamma_0$ and the ending angle of the curve $\gamma_n$ have no such points, a rule must be established for determining these angles. The rule is that angles between the tangents to the curve and the straight lines between the data points will be equal at both ends of the segment. Thus, for the beginning of the segment:

(38) $\quad \gamma_0 = 2\tan^{-1}\dfrac{y_1-y_0}{x_1-x_0} - \tan^{-1}\dfrac{y_2-y_0}{x_2-x_0}$ and for the ending segment,

(39) $\quad \gamma_n = 2\tan^{-1}\dfrac{y_n-y_{n-1}}{x_n-x_{n-1}} - \tan^{-1}\dfrac{y_n-y_{n-2}}{x_n-x_{n-2}}$ where $y_n$, $x_n$ represent the end point of the curve.

SPEED CONTROL

Figure 2:
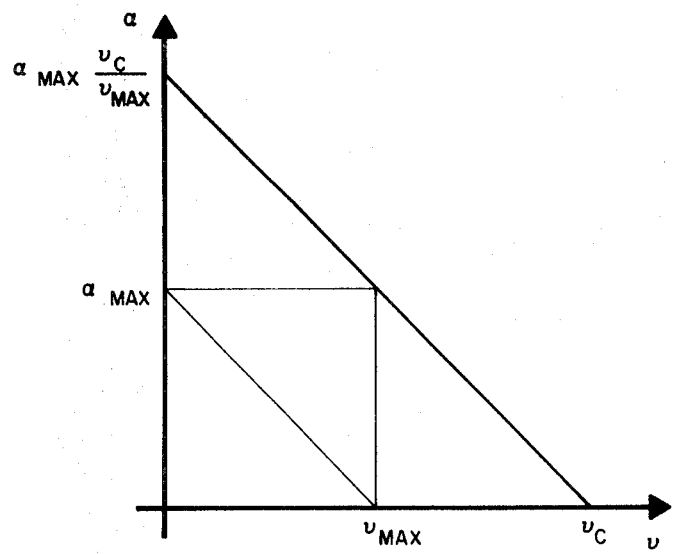
FIG. 2 is a diagram of acceleration versus velocity.

FIG. 2 shows a velocity acceleration saturation plot based on motor characteristics, arm weight, inertia, etc. The total velocity is controlled such that the saturation envelope of FIG. 2 will not be exceeded by the command acceleration and velocity. The total velocity and acceleration command is kept below the capability of each axis. Thus, when the segment being plotted is predominantly in $x$ or $y$, the plotter will be capable of following the command and, when the segment is in other directions, there is a margin in the plotter capability over the commands.

To further simplify the control, the tangential acceleration commands are restricted to values which reserve sufficient acceleration for "pulling curvature." The velocity at which the system can operate and still reserve sufficient acceleration to "pull curvature" is calculated. This velocity is a function of the curvature of the segment under consideration. If the actual velocity of the system is greater than the computed velocity, the system decelerates; if vice versa, it accelerates.

A look ahead technique is utilized to determine what acceleration must be commanded to be able to maintain the required curvature at maximum velocity and still be able to decelerate and stop as required. The look ahead technique is implemented as follows:

1. A look ahead distance is developed which is of sufficient length to allow the plotter to stop from maximum speed;
2. The maximum curvature for all segments within that distance is calculated; and
3. an acceleration command is generated corresponding to that velocity required to plot the calculated maximum curvature.

The equations for developing the acceleration commands are derived as follows:

Let $v$ = actual plotter velocity
$v_c$ = command velocity
$\alpha_c$ = acceleration capability of plotter at $v = v_c$
$an$ x normal component of acceleration
$at$ x tangential acceleration available after reserving $\alpha_t$ to "pull curvature" at $vc$ The normal component of acceleration is given by

(40) $\alpha_n = kv^2$ where $k$ is the curvature;

From the basic calculus, $k \times d\alpha/ds$ where $\alpha$ is the angle of inclination between the horizontal and the tangent to the curve at a point on the curve; and $s$ is the distance along the curve.

The expression for $k$ in terms of $z$ is given by;

(41) $k x (dd/dz)(dz/ds)$

From FIG. 1, the tangent of the angles $\gamma_1$ or $\gamma_2$ is equal to $dy/dx$, the slope of the curve so that:

(42) $\quad \dfrac{d\gamma}{dz} = \dfrac{d}{dz}\left(\tan^{-1}\dfrac{dy}{dx}\right)$ or

(43) $\quad \dfrac{d\gamma}{dz}\dfrac{d}{dz}\left(\tan^{-1}\dfrac{dy}{dz}\Big/\dfrac{dy}{dz}\right.$ which reduces to:

(44) $\quad k = \left(\dfrac{dx}{dz}\dfrac{d^2y}{dz^2} - \dfrac{dy}{dz}\dfrac{d^2x}{dz^2}\right)\left(\dfrac{dz}{ds}\right)^3$ From the first and second derivatives of equations 1 and 2
(45) $kx[(b_y a_x l a_y b_x) + (a_x c_y - a_y c_x) + 1/2(b_x c_y - b_y c_x) z^2](dz/ds)^3$ Order of magnitude studies using typical values show that $(dz/ds)$ can be assumed equal to 1 over the whole segment, Constraints 10–12 make ($dz/ds$) equal at the beginning, end, and middle of the segment.

The value of $k$ is calculated at the beginning and end of the segment and the maximum of these two values is selected. The local maximum of $k$ occuring interior to the segments is neglected to simplify the calculations.

(46) $\alpha_n = k_{max} v_c^2$

This equation, together with the equation:

(47)
$$\alpha = \pm \frac{\alpha_{max.}}{v_{max.}} (v_0 - v)$$ and letting $v_0 = v_{max.}$ yields

(48)
$$2v = -\frac{\alpha_{max.}}{k_{max.} v_{max.}} + \sqrt{\left(\frac{\alpha_{max.}}{k_{max.} v_{max.}}\right)^2 + 4\left(\frac{\alpha_{max.}}{k_{max.}}\right)}$$

Equation (48) represents the velocity $v$ which is commanded while reserving an acceleration $\alpha_n$ for pulling the curvature $k$max at the velocity $v$. Equation (47) represents the capability of the mechanical servosystem where $\alpha_{max}$ is the maximum acceleration (at "zero" velocity) and $v$max is the maximum velocity (at "zero" acceleration).

STOP/START LENGTH

Complete control of the plotter requires knowledge of the start and stop length required as a function of velocity and acceleration.

The hardware is arranged so that the value $vc$ in equation (47) can be controlled independently of the running velocity for any one curve. The magnitude of $vc$, therefore, defines the shape of the velocity/acceleration plot of FIG. 2.

By increasing $vc$, the start and stop length required to reach a velocity $v$max cannot be shortened at the expense of increased accelerations. In the limit where $vc$ is $v$max, the start length is infinite, and the accelerations are minimum. The start length is equal to the stop length in all cases and is expressed as

(49)
$$z_s = \pm \frac{v_{max.}}{\alpha_{max.}} \left[ v_0 - v + v_c ln \left( \frac{v_c - v_0}{v_c - v} \right) \right]$$

$v_0 =$ starting velocity at $zx0$
$v$ x velocity at distance $z$; and
$v_c =$ a constant For accelerational, $v0x0$; $vxv$max;$vc$ x constant; and the sign of $V_{max}/\alpha_{ax}$ is taken positive. For deceleration; $v_0 = v_{max}$; $v = 0$; $v_c$ = the same constant; and the sign of $v$max$/\alpha_{max}$ is taken negative.

The above equation is derived from equation (47) by integrating twice with respect to $z$, and noting that

(50) $\alpha = (dv/dt) = (dv/dz)dz(dt) = (dvdz)(v)$; where $\alpha =$ acceleration.

COMPUTER OPERATIONS

A portion of the above-defined equations are solved on a general purpose digital computer such as the IBM 360. Figures 5–12 show the flow chart for generating the quantities $ax$, $ay$, $bx$, $b_y$, $cxx$, $cy$, $z$ and $vc$ for the curve mode.

The following tables describe the program to develop the quantities.

TABLE I

SUBPROGRAM ORGANIZATION

| Name | Language | Function |
|---|---|---|
| Curve Mode | FORTRAN | Computations |
| INSRP | Assembly | Data management; convert full words to half words and place in common storage area |
| MUV | Assembly | Data management; relocate upper 1000 words of common storage into lower 1000 words |

TABLE I – Continued

| Name | Language | Function |
|---|---|---|
| VELC | Assembly | Data management; convert full word to half word and place in a specified address in common storage |
| TRANS | Assembly | Data management; shift 100 words of specified storage down one word, erasing first word as a result |
| GETCO | Assembly | Data management; retrieve 12 words of specified common storage, convert to 23 full words, and move to specified storage in FORTRAN program. Move specified number of words up 12 words in common storage starting at specified location. Insert new control word velocity half word into specified number of segments starting with specified address in common storage. |
| OUT | Assembly | I/O-Write specified number of full words into magnetic tape starting with first word of common storage of common storage. |
| ORIG | FORTRAN | Computational; Uses INSRP and OUT to write tape to move carriage with pen up to beginning of plot. |

Control Word Format

| Control Description | Code Decimal | Hexadecimal |
|---|---|---|
| Start of word (Control word less specific commands) | 901120 | 000DC000 |
| New Curve or line | Add 8192 | Add 00002000 |
| Standby (last word) | Add 4096 | Add 00001000 |
| Pen Up | If yes, add 1024 | If yes, add 00000400 |
| Line mode | If yes, add 256 | If yes, add 00000100 |
| End of curve or line (decelerate) | If yes, add 2 | If yes, add 00000002 |
| Examples: | Curve mode, pen down, not first segment | |
| | Decimal | Hexadecimal |
| | 901120 | 000DC000 |
| | Line mode, pen up, first segment (new line) | |
| | Decimal | Hexadecimal |
| | 910592 | 000DE500 |

TABLE II

| Variable | Description | Initial value |
|---|---|---|
| X | Array of X coordinates | From calling program. |
| Y | Array of Y coordinates | Do. |
| XPAR | Array of control parameters | Do. |
| YPAR | do | Do. |
| KOUNT | Number of array points | Do. |
| ZA | Array of segment length in look ahead. | None. |
| CRVMAX | Array of curvatures in look ahead. | Do. |
| BUFFER | Array of plotter commands in common storage. | Entire area set to blanks. |
| ASQ | Function for extracting vector length from delta X and delta Y | None. |
| J | First of the three points under computation at any one time. | 1. |
| I | Second of those points | 2. |
| M | Third of those points | 3. |
| L | Number of segments in long length look ahead. | 1. |
| LX | Number of segments in common storage into which a velocity value has been inserted. | 1. |
| KX | Both flag and counter for maximum velocity adjustment in section of discontinuous velocity. | 0. |
| JX | Number of segments in long length look ahead. | 1. |
| JSW | Flag to indicate standby at end of plot. | 1 (no standby). |
| CXO | X coordinate of last point of previous curve. | None. |
| CYO | Y coordinate of last point of previous curve. | Do. |

TABLE II—Continued

| Variable | Description | Initial value |
|---|---|---|
| IBUF | Subscript variable of BUFFER. | 1. |
| KOUNT2 | KOUNT-1 | |
| NCB | Maximum size of record (words) to be written onto magnetic tape at any one time. | 990. |
| IFLIP | Flag used for dash line mode (1 is for blank portion of dash line). | 0 (solid line portion of dash line). |
| VMAY | Maximum commanded velocity. | 16. |
| AMAX | Maximum normal acceleration. | 24. |
| LAST | Flag indication last point in plot has been encountered. | 0. |
| CLSCRV | Flag indicating a closed curve. | 0. |
| IFLAG | Flag indicating whether total length of curve is greater than look ahead. | 0. |
| Z1 | Length of dummy request. | 0. |
| IAX, IAY, IXL, IYL, IBX, IBY, ICX, ICY | Addresses of storage into which subprogram "GETCO" transfers coefficient from common storage. (Order of appearance in Fortran is important and must be as shown). | 0. |
| SUMS | Sum of lengths of segments included in long length look ahead at any one time. | 0. |
| SUMZ | Sum of lengths of all segments included in short length look ahead at any one time. | 0. |
| IOUT1 | Control word | 901120. |
| IOUT2 | Segment length | None. |
| IOUT3 | Velocity | Do. |
| IOUT4 | AX coefficient | Do. |
| IOUT5 | AY coefficient | Do. |
| IOUT6 | BX coefficient | Do. |
| IOUT7 | BY coefficient | |
| IOUT8 | CX coefficient | Do. |
| IOUT9 | CY coefficient | Do. |
| IOUT10 | X position at beginning of segment. | Do. |
| IOUT11 | Y position at beginning of segment. | Do. |

DESCRIPTION OF FLOW CHARTS

The numbers preceding each paragraph refer to the block number of the flow chart.

Curve-FORTRAN

1. The coordinate positions of each data point in the given array are doubled. This is done so that the coefficient of the third order parametric equations (1) and (2) can be halved after they are computed and before they are written onto magnetic tape. This prevents overflow from occuring in the coefficient register of the final DDA integrators. These would be the "AX" and "AY" The scale factor is also introduced at this point. Note that the scale factor is a divider so that a factor of 4 would result in a plot one-fourth the size of the plot described by the given data array.

2. The parameter "XPAR" (6) is a flag to indicate whether the pen is starting from the origin (XPAR (6)=0) or from the end of some previous plot (XPAR (6)=1).

3. CALL "ORIG" subprogram to write plotter instructions on magnetic tape that will move the carriage with pen up to the beginning of plot. The previous block identified the current position of the carriage. XPAR (7) and YPAR (7) serve to transfer the coordinate of the end of the previous plot if any. XPAR (3) and YPAR (3) are the origin coordinates of the current plot. The coordinate of the last point of the previous plot are given by:

(51) $CXO = XPAR(3) + X(1)/2$

(52) $CYO = XPAR(3) + Y(1)/2$

4. Table II lists the variables giving name, description, and initial value of each. Those variables which require setting to an initial value are so set at this point in the program.

5. The J counter is tested for equality to 1.

6. The first and last coordinate values are tested for equality to each other. If the first point has the same position as the last, the "CLSCRV" flag is set.

7. The I counter is tested for equality to KOUNT.

8. The following equations are executed:

(53) $DEL X2 x X(M) - X(J)$

(54) $DEL y2 x Y(M) - Y(J)$

(55) $ASQ2 x$ SQUARE ROOT $(DEL X2) * (DEL X2) + (DEL Y2) * (DEL Y2)$

(56) $ACOS2 x DEL X2/ASQ2$

(57) $ASIN2 x DEL X2/ASQ2$

9. Set last = 1. Test LX for equality to 1. I flag 21 is LX = 1. This indicates that total curve length is less than look ahead distance.

10. For a closed curve, the following equations are executed:

(58) $DEL X1 x X(I) - X(KOUNZ)$

(59) $DEL Y1 x Y(T) - Y(KOUNZ)$

(60) $DEL X2 x X(M) - X(J)$

(61) $DEL Y2 x Y(M) - Y(2)$

(62) $AXQ1 x$ SQUARE ROOT $(DEL X1* DEL X1 z DEL Y1 z DEL Y1)$

(63) $ASQ2 x$ SQUARE ROOT $(DEL X2* DEL X2 z DEL Y2 z DEL Y2)$

(64) $ACOS 1 x DEL X1/ASQ1$

(65) $ASIN 1 x DEL Y1/ASQ1$

(66) $ACOS 2 x DEL X2/ASQ2$

(67) $ASIN 2 x DEL Y2/ASQ2$

If the curve is not closed, the following equations are executed:

(68) $DEL X1 x X(I) - X(J)$

(69) $DEL Y1 x Y(I) - (J)$

(70) $DEL X2 x X(M) - X(J)$

(71) $DEL Y2 x Y(M) - Y(J)$

(72) $ASQ1 x$ SQUARE ROOT $(DEL X1* DEL X1 z DEL Y1* DEL Y1)$

(73) $ASQ2 x$ SQUARE ROOT $(DEL X2* DEL X2 z DEL Y2* DEL Y2)$

(74) $ACOS1 x DEL X1/ASQ1$

(75) $ASIN1 x DEL Y1/ASQ1$

(76) $ACOS2 x DEL X21ASQ2$

(77) $ASIN2 x DEL Y2/ASQ2$

(78) $ADCOS1 x ACOS1* ACOS1 1 ASIN1* ASIN1$

(79) $ADSIN1 x 2 z ASIN2 z ACOS1$

(80) $ASIN1 x ADSIN1 z ACOS2 1 ADCOS1 z ASIN2$

(81) $ACOS1 x ADCOS1 z ACOS2 z ADSIN1 z ASIN2$

11. The segment length Z2 and the coefficient AX, AY, BX, BY, CX, CY can all be computed from equations 12A through 12F, 15 and 16 with the following substitutions:

(82) $X2 1 X1 x DELX1$

(83) $Y2 1 Y1 x DELY1$

(84) $COS \gamma_2 = ACOS2$

(85) $COS \gamma_1 = ACOS1$

(86) $Sin \gamma_2 = ASIN2$

(87) $Sin \gamma_1 = ASIN1$

12. Each of the coefficients are tested for absolute magnitude. If the BX or BY coefficients exceed 2 or the CX or CY coefficient exceed 4, the branch to a recompute sequence is affected.

13. & 14. The following equations are executed:

(88) $AX x AX/2$

(89) $AY x AY/2$

(90) $BX x BX/4$

(91) $BY x BY/4$

(92) $CX x CX/8$

(93) $CY x CY/8$

(94) $Z x Z* 2$

A study of equations (1) and (2) will show that the above alteration of the coefficient does not change the geometry of the curve. It does, however, reduce the magnitude of each coefficient. This sequence is repeated until the coefficient are less in magnitude than the above specified limits. These limits are set by the nature of the DDA integrator and the size of their registers. Also too small a value in the coefficient register of either the "B" or "C" integrators will result in appreciable error after a long integration length. This sequence will have the undesirable effect of halving, quartering, etc., the velocity of the plotter upon encounter with this segment. To minimize the subsequent infinite acceleration, the velocity of the arm before entering this segment must be considerably reduced. To do this, the flag KX is set equal to the look ahead segment count JX. The effect of this flag will be discussed under paragraphs 35, 36, and 37.

15. Each coefficient is normalized and shifted left 15 positions by the following equations. The inherent subroutine IFIX is also employed to convert the coefficient from floating point to integer format.

(95) * $IOUT4=IFIX(AX/2.*32767.+0.5)$
(96) * $IOUT5xIFIX(AY/2.*32767.z.5)$
(97) $IOUT6xIFIX(BX/2.*32767.+.5)$
(98) $IOUT7=IFIX(BY/2.*32767.+.5)$
(99) $IOUT8=IFIX(CX/4.*32767.+.5)$
(100) $IOUT9=IFIX(CY/4.*32767.+.5)$

* It should be noted that in order to correct for doubling, the X and Y array values in paragraph 1, the following alteration to the coefficients must be made:

(101) $AX=AX/2$
(102) $AY=AY/2$
(103) $BX=BX/4$
(104) $BY=BY/4$
(105) $CX=CX/8$
(106) $CY=CY/8$

The first coefficient division (e.g. 76 and 77) are accomplished in the software equations (70) and (71). The balance of the alterations are implemented as a result of the scaling of the hardware DDA integrators. The absolute position reference information is computed by the equations:

(107) $IOUT10xIFIX(512.*(XPAR(3)+X(J)/2.))$
(108) $IOUT11=IFIX(512.*(YPAR(3)+Y(J)/2,))$

Here, as in the case of the segment length, the normalization takes the form of a multiplication by 512. This is a result of the hardware digital shaft encoder which generates 512 pulses per inch of carriage travel. The segment length is therefore:

(109) $IOUT2xIFIX(Z*512.z.5)$

16. YPAR (8) is tested for equality to zero. If it is zero, the line is continuous; if it is greater than zero, the line is to be dashed.

17. through 20. IFLIP is tested. If it is zero, the segment is blank (pen up); if it is 1, the segment is solid (pen down).

21. CALL "INSRP" converts IOUT value to half words and locates them in the common storage as specified by buffer (IBUF). IBUF is increased by 12 (if hardware has buffer memories, this can be reduced to 6).

22. & 23. If the counter LX is greater than 84, all the segments in the first section of common storage have velocities inserted and are ready to be written onto magnetic tape.

24. CALL "MUV" moves 1,000 words starting from location BUFFER (997) to BUFFER (1).

25. From equation (18), the curvature at Zx0 can be computed as (110) $Curve = AX*BY+AY*BY$
In order to compensate for doubling, the X and Y data coordinate positions, curve 1 must be increased 4 times so that:
(111) $Curve\ 1=4*Curve\ 1$
At $Z=Z2$, the curvature can be computed from equation (19) as:
(112) $Curve\ 1+4*(AX+CY=AY+CX)*Z+(BX*CY-BY+CY)*Z*Z$ Differences between this equation and (18) accrue from the above-mentioned correction for doubled X and Y coordinates.

Figure 9:
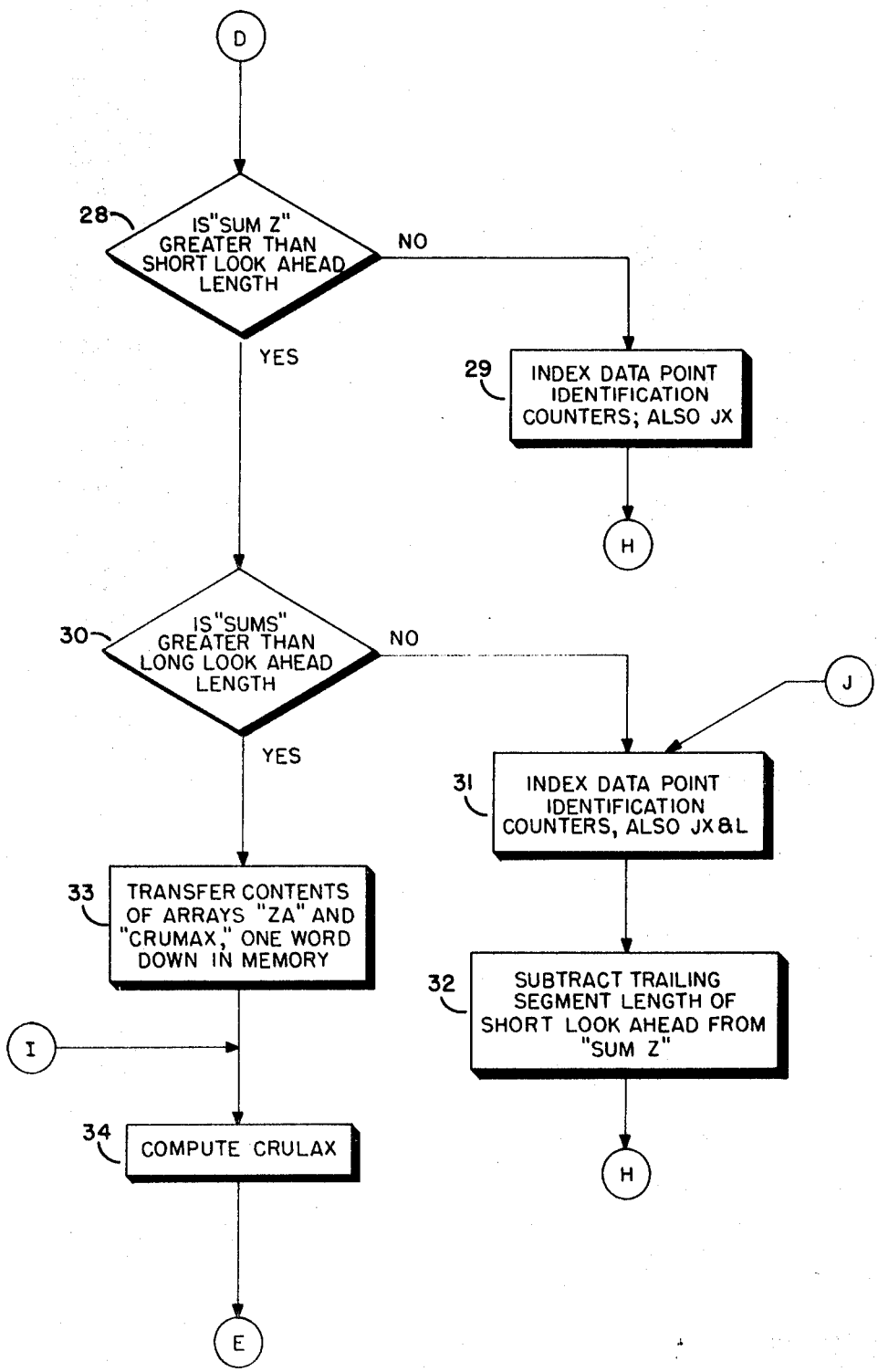

The largest of these two (absolute value) is taken as
(113) $CRVMAX(JX) = AMAX1(ABS[CURV1 1], ABS[CURV2])$ The long length look ahead SUMS is incremented by the length of this segment.
(114) $SUMS=SUMS+ZA(JX)$ 26. & 27. The short length look ahead SUMZ is incremented by this segment length.
(115) $SUMZ=SUMZ+ZA(JX)$ 28. through 31. The function of these blocks is shown in FIG. 9.

32. The trailing segment of the short length look ahead SUMZ is subtracted:
(116) $SUMZ=SUMZ-ZA(L)$ 33. The subroutine TRANS (ARG) transfers 100 32-bit words of memory down one 32-bit word thereby overwriting the first word. The first word location is given by the argument (ARG). This permits the storage of only those segments pertinent to the look ahead section of the curve. Only the length and maximum curvatures of each pertinent segment are stored and transferred this way.

34. The maximum curve of all those in the short look ahead is computed as:
(117) $CURVLAX=AMAX1(CRVMAX[KUMMY], CRVLAX)$
where KUMMY is indexed by means of a DO loop.

Figure 10:
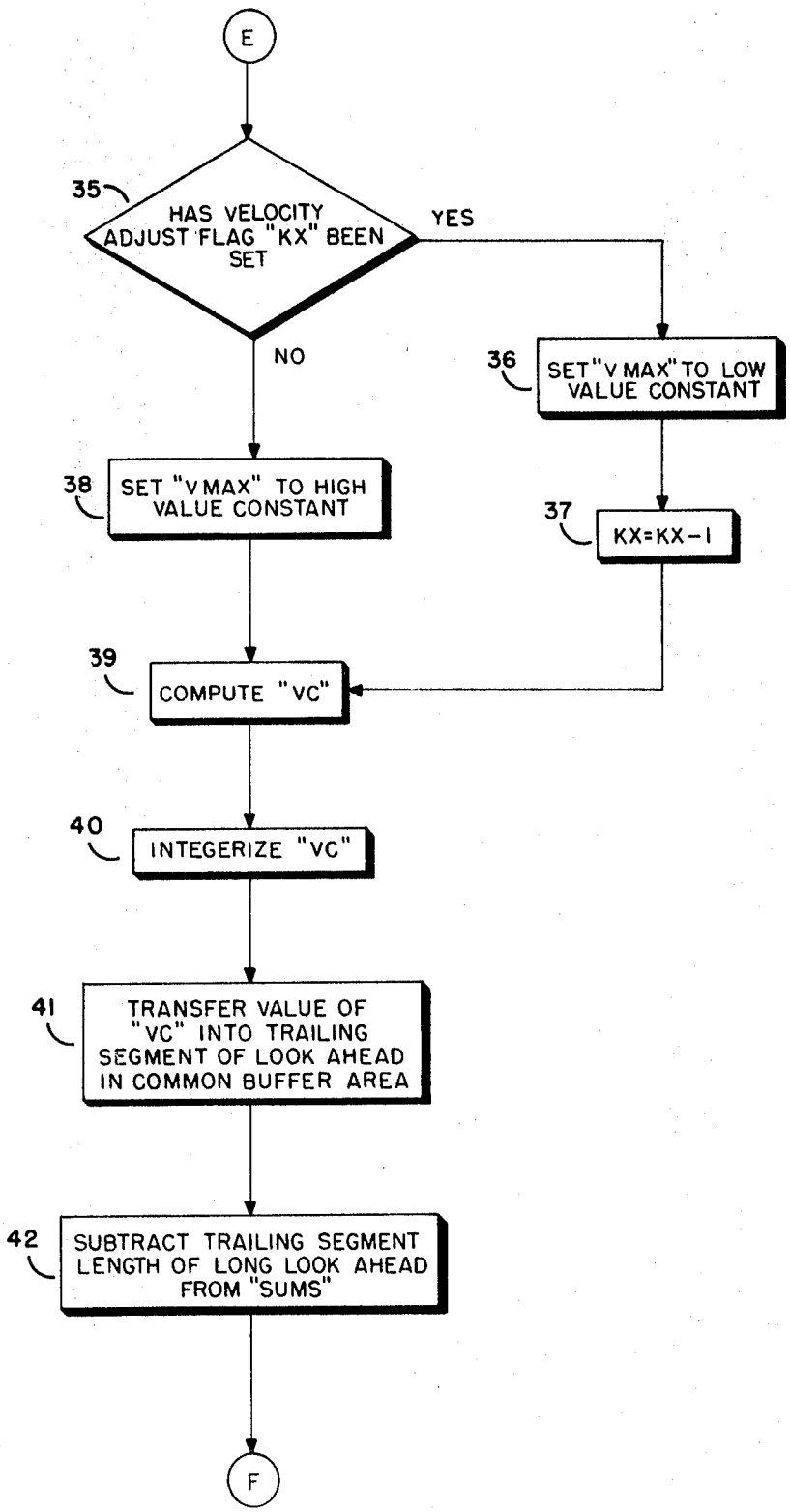

35. V max is set equal to 4.
36. & 37. The function of these blocks is shown in FIG. 10.
38. V max is set equal to 16.
39. The computation for VC (command velocity) derives from equation (23) as follows:
(118) $DEM=AMAX/(2.0*CRULAX*V\ MAX)$
(119) $VC=-DEM+SQRT(DEM*DEM+AMAX/CRVLAX)$
In order to compensate for doubling the X and Y coordinates, VC must be doubled:
$$VC=2.*VC$$

40. The velocity is integerized036091965 and normalized to conform to the scaling of the DDA integrators:
(120) $IOUT3=IFIX(VC/32.*32767.z5)$ 41. The subroutine VELC converts IOUT3 to a half word and moves it into the proper location in common buffer storage. That location is given by:
(121) $1OC=IBUF-12*JX++L$
Where 1OC is the number of 32-bit words measured from 0 in common storage. THe VELC subroutine places the velocity half word in the lower (LSB) 16 bits of the 1OC word.

42. The trailing segment of the long look ahead is subtracted from:
(122) $SUMS=SUMS-ZA(1)$
NOTE: This is always the first (ZA[1]) word in the look ahead array because of the transfer made in paragraph 33.

Figure 11:
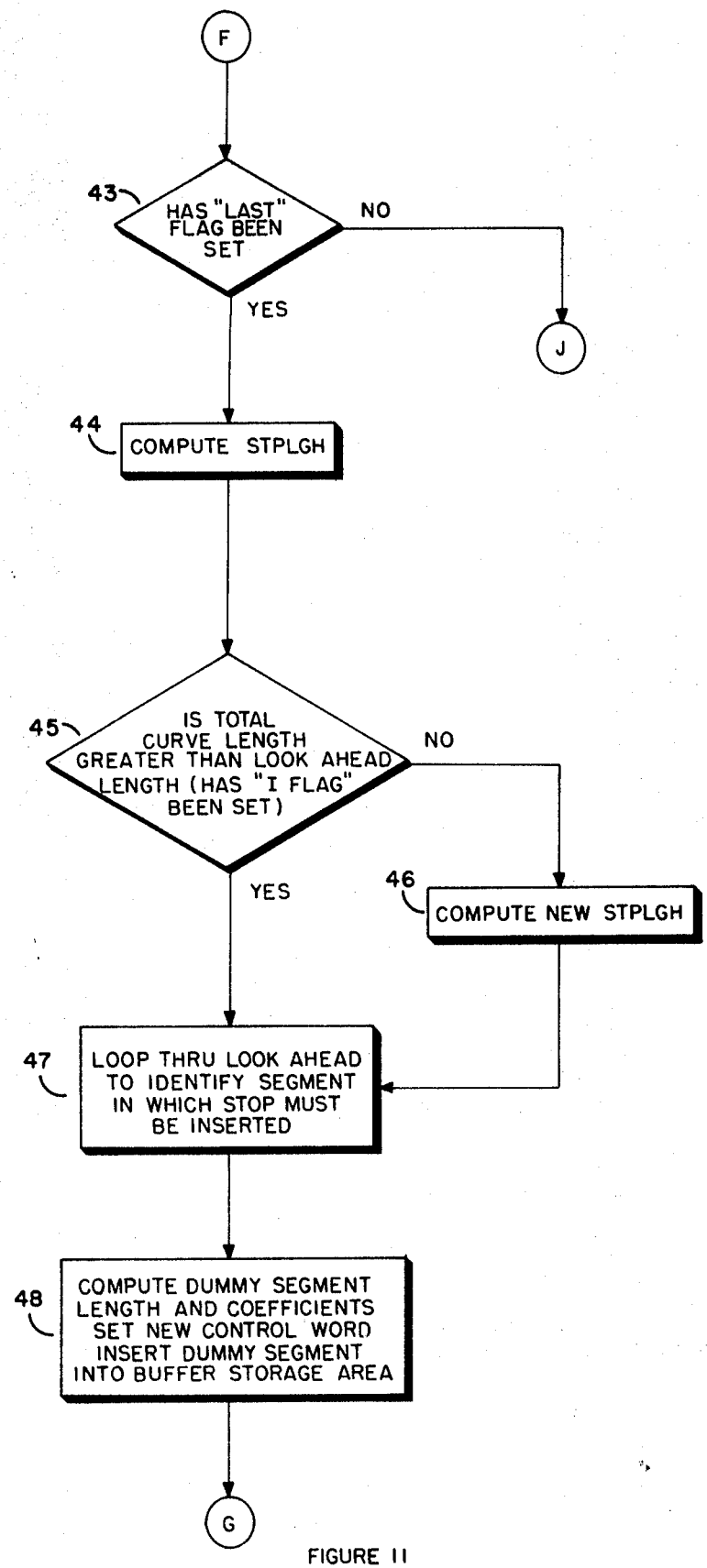

43. The function of these blocks is shown in FIG. 11.
44. The stop length can be derived from equation (49):
$STPLGH=-.5z(VC+36.*ALOG[36.-VC]/36.]$
NOTE: The constant 36 is set by ORIG subroutine and is discussed in the description of that subroutine. This same constant appears as VC in equation 24 while V0 and V in equation (49) appear as VC in equation (99).

45. The function of these blocks is shown in FIG. 11.
46. The stop length is one-half the total curve length:
(123) $STPLGH=SUMS/2$ 47. A dummy data point must be created so that the length of curve from the dummy point to the end of curve is exactly equal to the stop length. This dummy point will necessarily fall somewhere between two existing data points. The following program finds those existing points:
(124) DO 354 K=1, JX
   SUMS=SUMS-ZA(K)
   IF (SUMS-STPLGH) 351, 351, 352,
   352 continue
   354 continue
   351 continue So that K contains the number of segments from the beginning of the long look ahead such that the remaining value of SUMS is less than the stop length. The dummy segment, therefore, must be inserted between the K−1 and the K segment. Furthermore, the K−1 segment length must be shortened so as to end that segment at the beginning of the dummy segment. Since the ZX, AY, BX, and BY coefficients as well as the X and Y positions have changed, these values must be computed for the dummy segment. These coefficients and positions values should be the same as those already in the respective registers when the dummy segment is loaded from the magnetic tape into the hardware.

48. To do this, the coefficients and position values of the $K-1$ segment must be retrieved from common storage buffer, converted to full words, and finally converted to floating point format. The GETCO subroutine does this as well as install the current $VC$ velocity into all the segments form 1 to $K$ of the look ahead. The GETCO subroutine also moves the segments from $K$ to $JX$ up one segment (9 or 12 words* this depends on whether the hardware core buffers or not) in common buffer memory to make room for the dummy segment.

*The conversion to floating point is actually done in the FORTRAN CURVE subroutine.

These coefficients are used to calculate the new coefficient of the dummy segment as follows:

(125) $Z1=SUMS++ZA(K)-STPLGH$
(126) $ZA(K)=ZA(K)-Z1$
(127) $ISLOW=IBUF-12*JX$
(128) $KALL=IBUF-12*(JX-K+1)$
(129) $IOUT2=IFIX(Z1*512.+.5)$
(130) $KNT1=JX-K+1$
(131) $KNT2=K$
(132) CALL GETCO (BUFFER [KALL ], IOUT2, IAZ, BUFFER [IBUF ], BUFFER [ISLOW ], KNT1, KNT2, IOUT3)
(133) $AX1xFLOAT(IAX)/32767.$
(134) $AY1=FLOAT(IAY)/32767.$
(135) $BX1=FLOAT(IBX)/32767.$
(136) $BX1=2.*BX1$
(137) $BY1=FLOAT(IBY)/32767.$
(138) $BY1=2.*BY1$
(139) $CX1=FLOAT(ICX)/32767.$
(140) $CX1=4.*CX1$
(141) $CY1=FLOAT(ICY)/32767.$
(142) $CY1=4.*CY1$

The new coefficients and positions are calculated from equations 1 through 6.

(143) $XL1= AX1*Z1+.25*BX1*Z1*Z1+(1./12.)*CX1*1*Z1*1$
(144) $YL1=AY1*Z1+.25*BY$ $1Z1*Z1z(1./12.)*CY1*Z1*Z1*Z1$
(145) $AY1=.5*(2.*AX1+BX1*Z1+.5*CX1*Z1*Z1)$
(146) $AY1=.5*(2.*AY1+BY1*Z1+. 5*CY1*Z1*Z$
(147) $BX1=BX1+CX1*Z1$
(148) $BY1==BY1+CY1*Z1$

Intergerizing and setting the proper control word:

(149) $IOUT1+901122$
(150) $IOUT20=IFIX(ZA[K]*512.+.5)$
(151) $IOUT4=IFIX(AX1*32767.+.5)$
(152) $IOUT5=IFIX(AY1*32767.+.5)$
(153) $IOUT6=IFIX(BX1/2.*32767.+.5)$
(154) $IOUT7=IFIX(BY1/2.*32767.+.5)$
(155) $IOUT8=ICX$
(156) $IOUT9=ICY$
(157) $IOUT10=IFIX(512.*XL1+.5)+IXL$
(158) $IOUT11=IFIX(512.*YL1+.5)+IYL$
(159) $KALL=KALL+12$

CALL INSRP (IOUT1, IOUT2, IOUT3, IOUT4, IOUT5, IOUT10,
IOUT11, IOUT6, IOUT7, IOUT8, IOUT9, BUFFER [KALL]

This above sequence has served to install the proper dummy segment. The control word $IOUT1=901122$ flags the hardware to begin deceleration.

Figure 12:
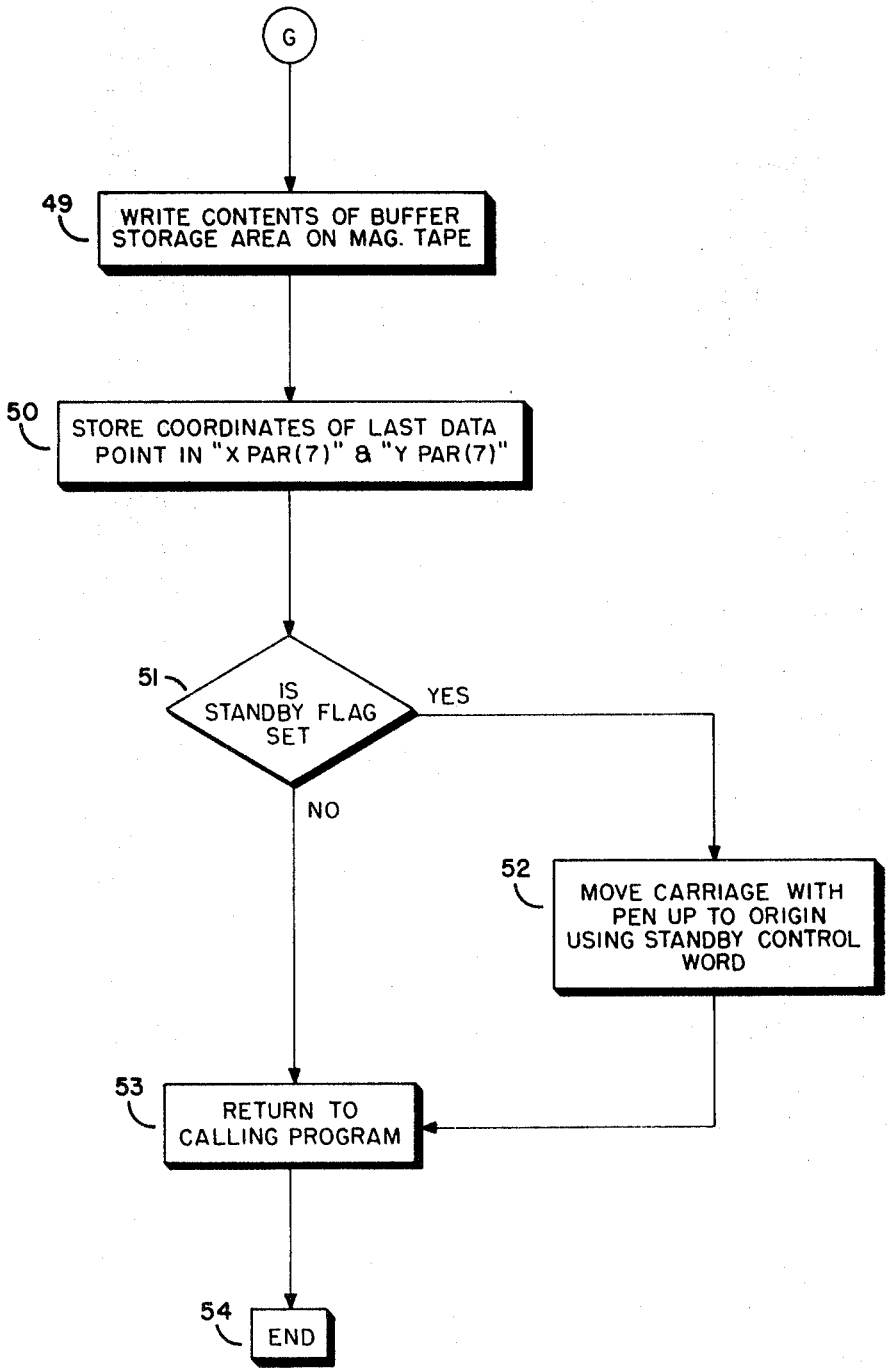
Figure 13:
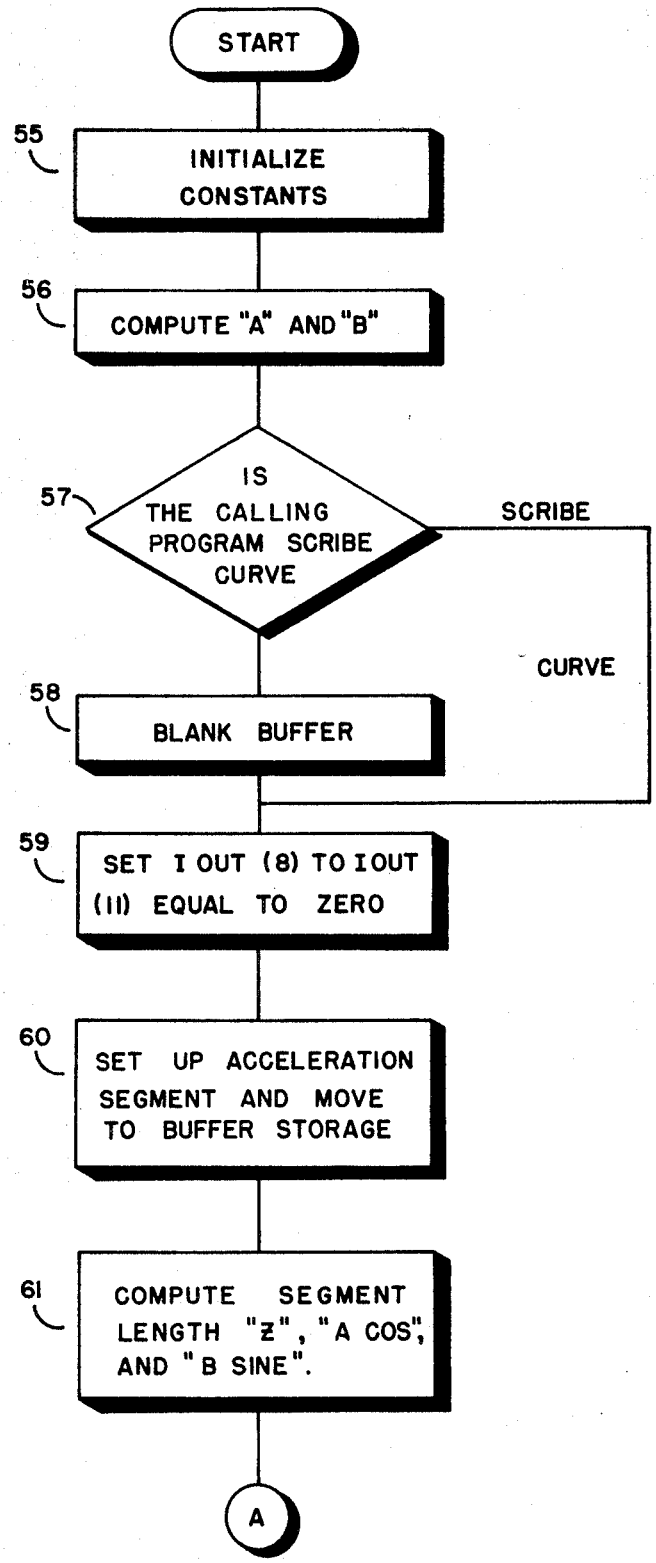

49. The function of these blocks is shown in FIG. 12.

50. A call to the $OUT$ subroutine writes the $IBUF$ z five words of common storage onto magnetic tape.

51–54. The function of these blocks is shown in FIG. 12.

For line mode, $bx$, $by$, $cy$, $cx$ are zero, yielding a linear equation for $x$ and $y$. Obviously $K$ also equals zero since a straight line has no curvature.

Figure 5:
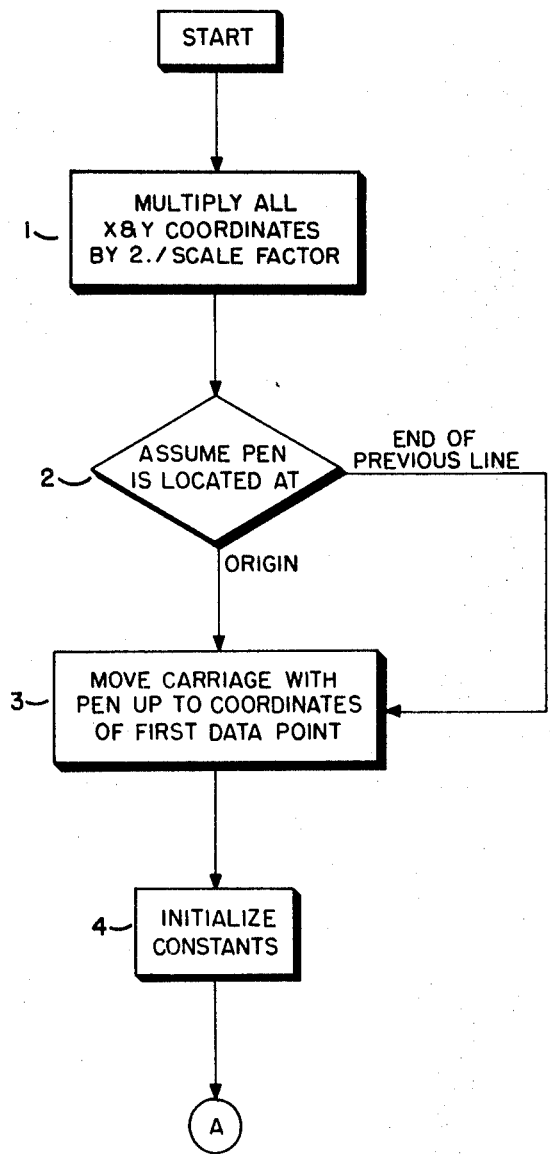
FIGS. 5-16 constitute a flow chart showing the solution of certain quantities by a general purpose digital computer.
Figure 6:
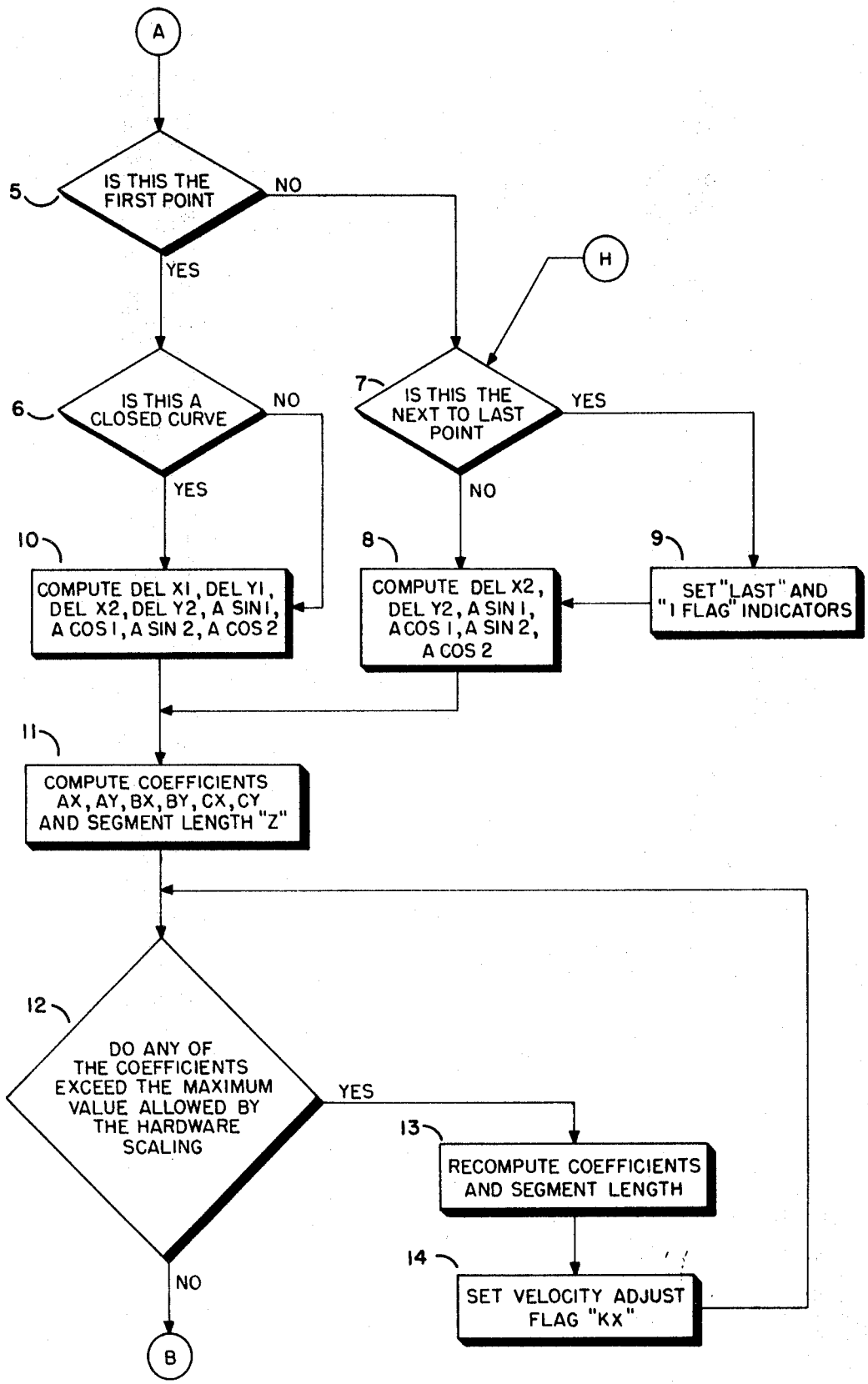
Figure 7:
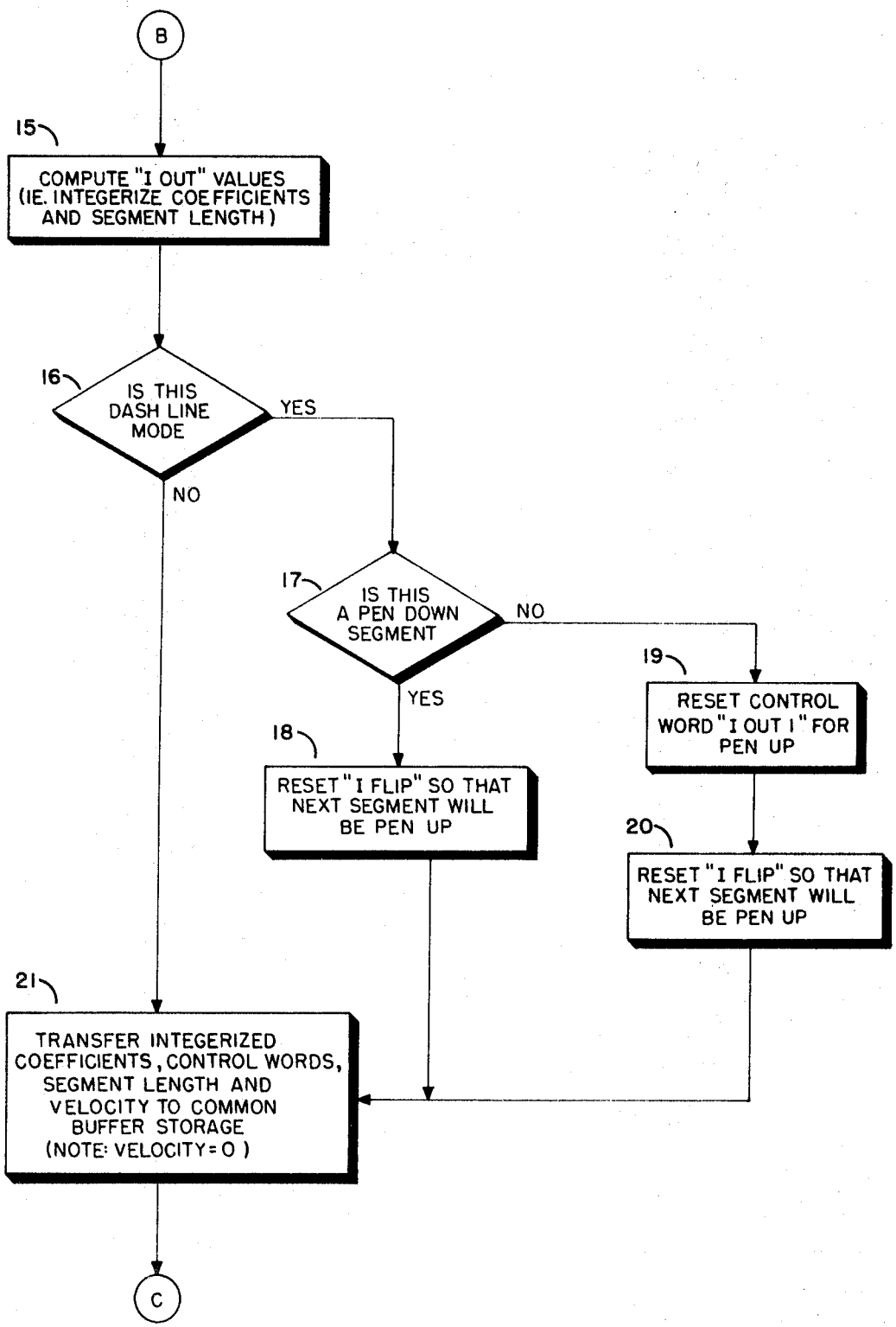
Figure 8:
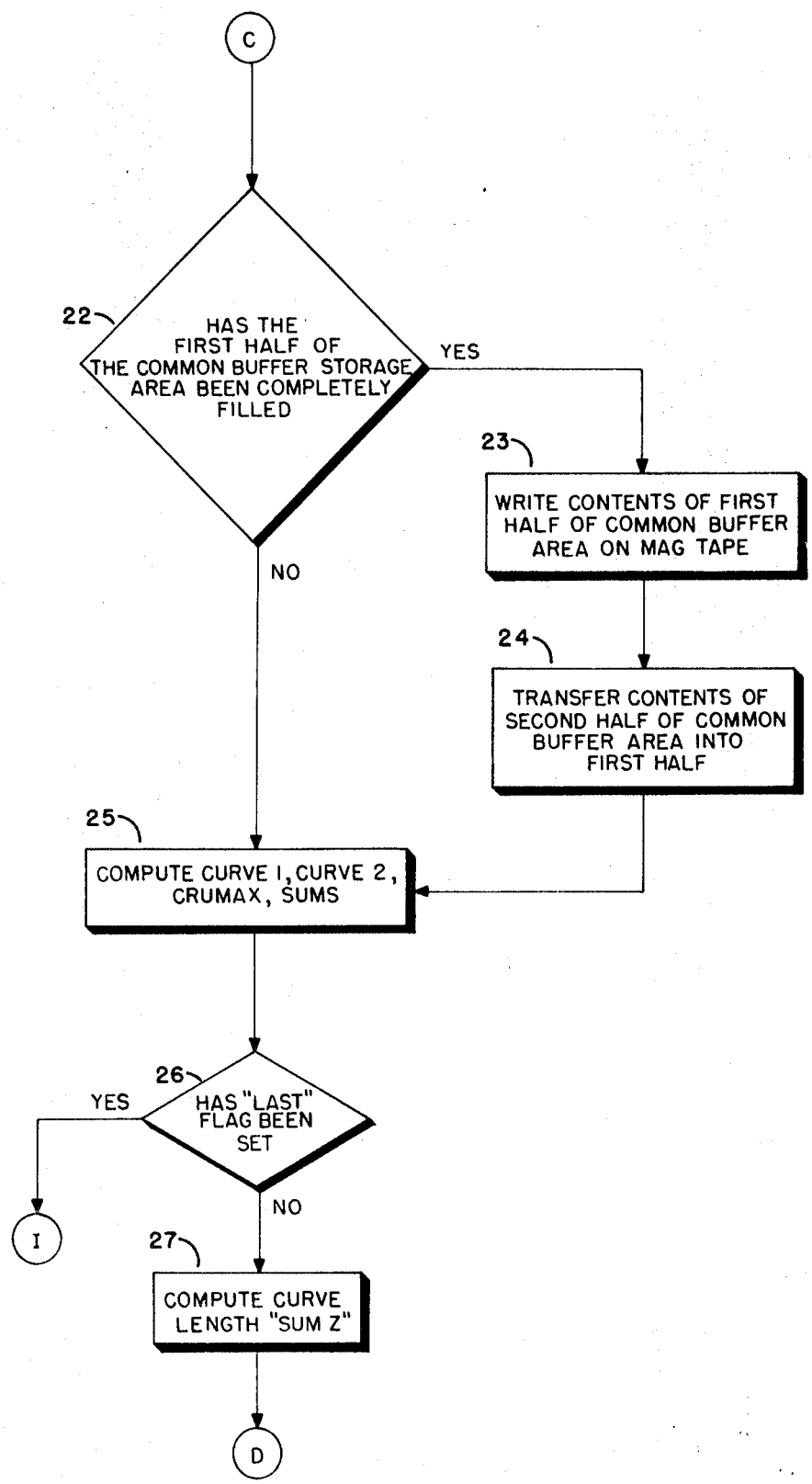

FIGS. 13–16 represent a flow chart for the "ORIG" subroutine described in connection with block 3 in FIG. 5. The purpose of this subroutine is to move the carriage with the pen up, and to set accelerations for the curve mode and set standby control word if so instructed.

The line mode of hardware operation is used exclusively. In this mode only the first four words (16 bytes) of every segment are read into the hardware register; however, to keep the format identical in length to the "curve" and "scribe" software, the length from segment to segment has been kept at 12 words (48 bytes).

DESCRIPTION OF FLOW CHART

The numbers preceding each paragraph refer to the block number of the flow chart.

55. Table III below lists the name, description, and initial value, if any, of the parameters used in this subroutine.

56. Note that:
$A=DELTA$ $X=X2-X1$
$B=DELTA$ $Y=Y21Y1$,
where $X1$, $Y1$, and $X2$, $Y2$ are beginning and end points of a line.

57. The indicator SW is tested to determine if the calling program is curve, scribe, or a standby from either of these. The value of this indicator must be set by the calling program.

58. The 2,000 words of the common buffer [BUFFER ($IBUF$)] are set equal to blanks (='107792576).

59. Since the carriage motion is always linear in this operation, line mode is used and the $IOUT$ (8) to $IOUT$ (11) parameter are set to zero.

60. The acceleration is set at a maximum (32767. which is a full 16-bit register) by means of $IOUT$ (3). The control word 910592 is for a new line which flags the hardware to load $IOUT$ (3) into the acceleration integrator register as well as velocity integrator register. $IOUT$ (6) and $IOUT$ (7) are the absolute positive normalized to 512 counts per inch and integerized. $INSRP$ subroutine packs the $IOUT$ integers into half words and moves them to buffer storage.

61. The segment length "Z" is:
$ZxSQUARE$ $ROOT$ $(A* AzB*B)$
Also:
$ACOSxA/Z$
$BSINxB/Z$ 62. Sixteen inches are required for the carriage to accelerate to 32 inches per second and another 16 inches are required for deceleration back to zero (32 inches/sec. constant acceleration). If the calculated segment length $Z$ is less than 32 inches, the deceleration must start at exactly ½$Z$.

Figure 14:
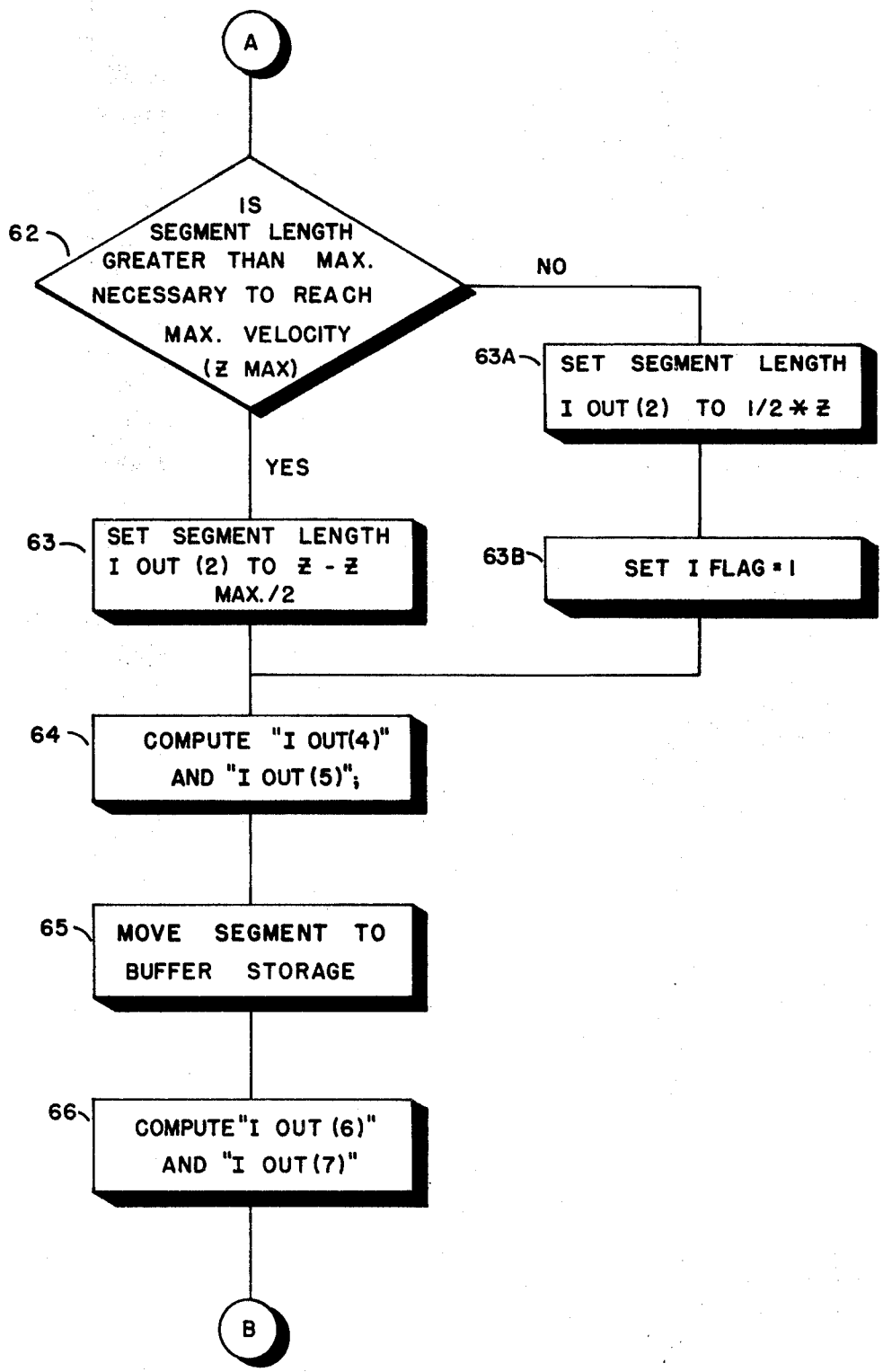

63. The function of this block is shown in FIG. 14.

64. $IOUT$ (4) and $IOUT$ (5) are the $ACOS$ and $BSIN$ values respectively. The $IOUT$ values must be normalized to a 16-bit register and integerized.

65. Call $INSRP$.

66. $IOUT$ (6) and $IOUT$ (7) are the absolute position values normalized to 512 counts per inch and integerized.

67. If a standby ($SW=O$) is called, the proper control word must be inserted as $IOUT$ (1).

Figure 15:
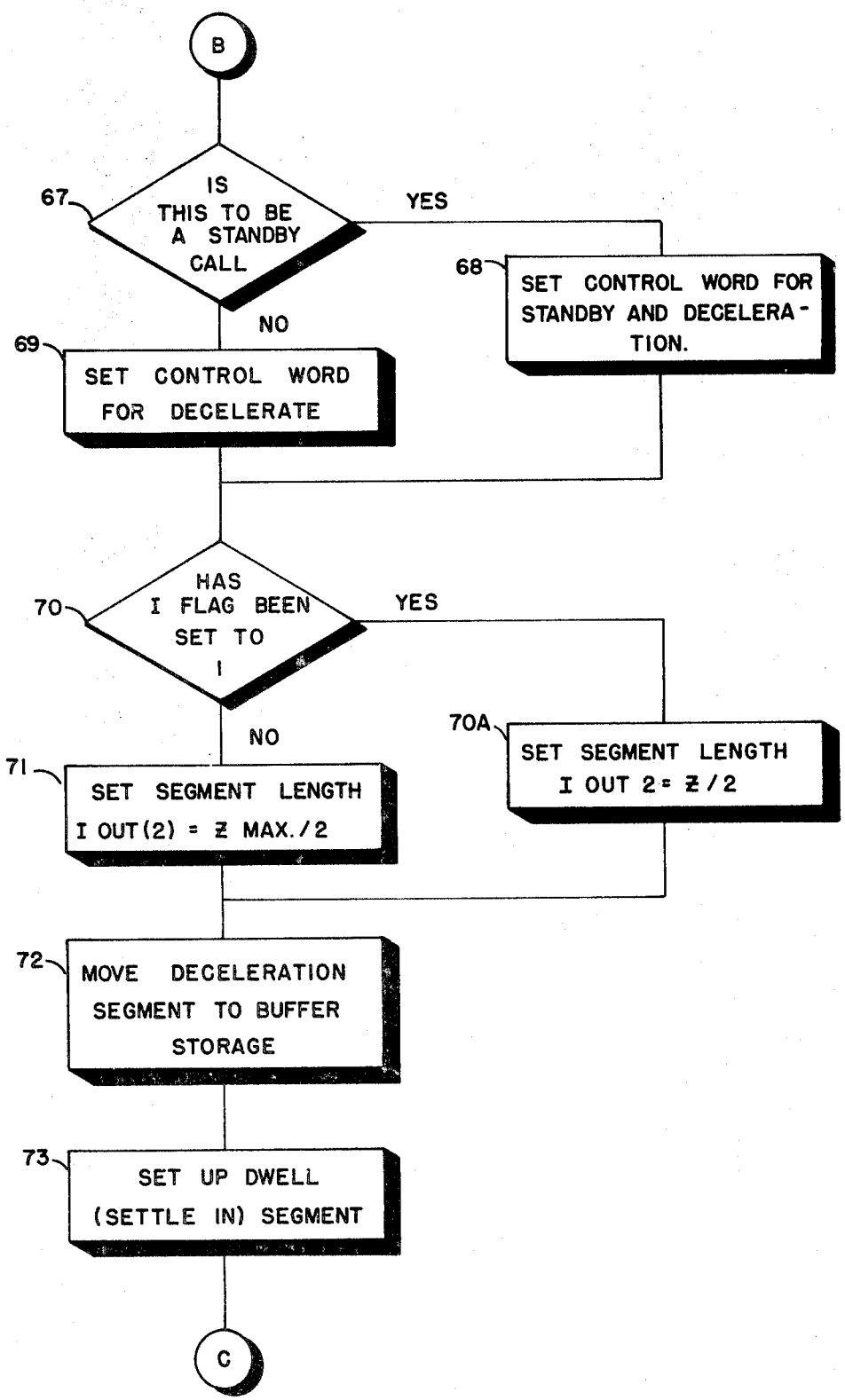
Figure 16:
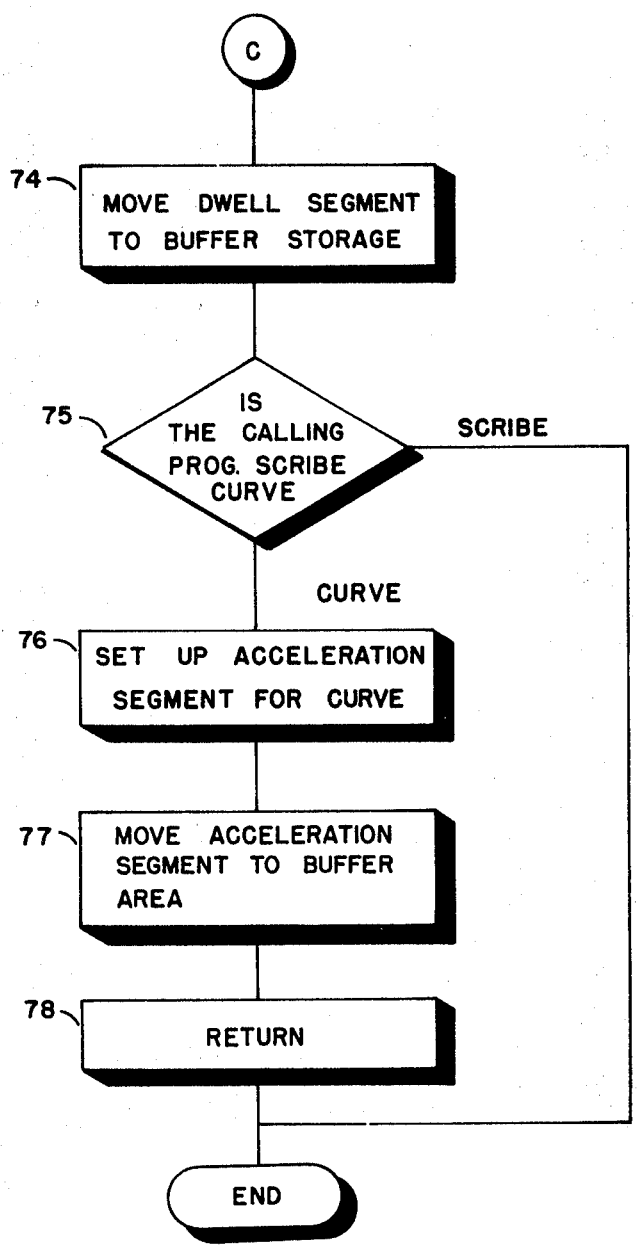

68–73. The function of these blocks is shown in FIG. 15.

74. A dummy segment is included which does not command a carriage motion [i.e. $IOUT$ (4)=0$IOUT$ (5) =0] but does specify a segment length [$IOUT$ (2) ] and a velocity [$IOUT$ (3) ]. This produces the effect of a time delay which allows the carriage to "settle in" after overshoot due to the high deceleration described in block 60.

75. If the calling program is curve, an accceleration for that mode is required to be set by "ORIG." Although the value is "maximum" register (32767=32 inches/sec./sec.), inches/sec. the actual acceleration as experienced by the carriage is only half that or 16 inches/sec.

TABLE III

["ORIG" subroutine]

| Parameter | Description | Initial value |
|---|---|---|
| FLAG | Indicator to identify a segment whose length is less than that necessary to reach maximum velocity. | 0 |
| SW | Indicator to identify calling program. SW=1 Curve Mode. SW=0 Scribe or Curve Mode with Standby. SW=−1 Scribe Mode. | None (¹) (¹) (¹) |
| A | Delta X | |
| B | Delta Y | |
| BUFFER | Name of common storage used as I-0 Buffer | |
| IBUF | Location of buffer | |
| IOUT (1)* | Control word | |
| IOUT (2) | Segment length | |
| IOUT (3) | Velocity | |
| IOUT (4) | Direction cosine | |
| IOUT (5) | Direction sine | |
| IOUT (6) | X position | |
| IOUT (7) | Y position | |
| IOUT (8) | Dummy parameter | 0 |
| IOUT (9) | do | 0 |
| IOUT (10) | do | 0 |
| IOUT (11) | do | 0 |
| Z | Segment length | |
| ACOS | Direction cosine | |
| BSIN | Direction sine | |
| ZMAX | Segment length required to reach maximum velocity and then decelerate to zero. | 32 |
| ZAP | Segment length to start of deceleration segment. | |

¹ Set by Calling Program.
*Note.—All IOUT parameters are normalized and integerized.

STRUCTURE

Figure 3:
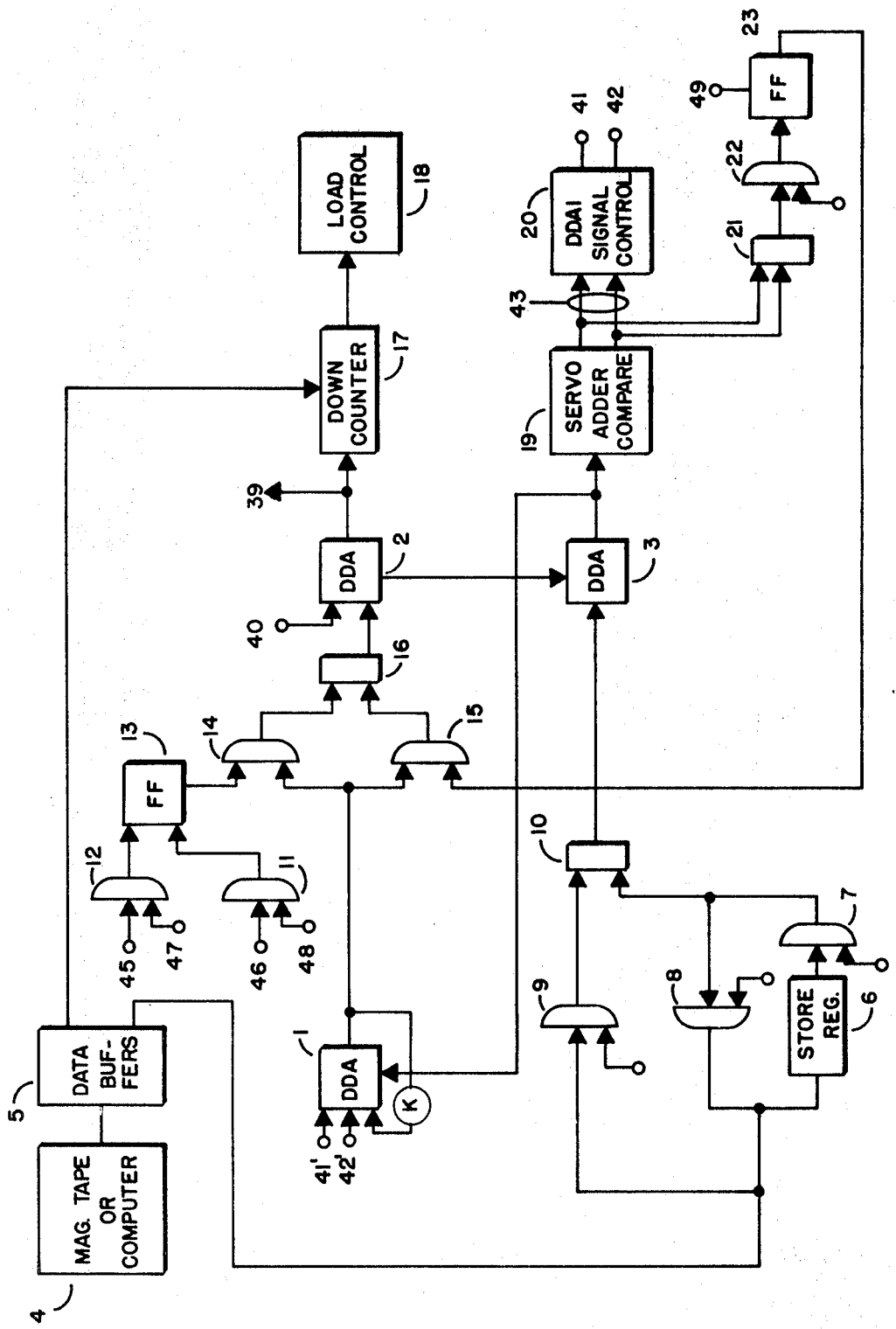
FIG. 3 and 4 are block diagrams of circuitry employed in the present invention.

The output signals representing $ax$, $bx$, $cx$, $ay$, $by$, $cy$, $z$ and $vc$, computed by the above-described routine on a general purpose digital computer are fed either directly or by way of magnetic tape stage 4, to data buffers represented by numeral 5. The data buffers serve to hold the data for transmission to certain of the structural elements shown in FIGS. 3-4.

The command velocity $ve$, from buffers 5, is fed to a store register 6 and a logical AND gate 9. The output of AND gate 9 is coupled to a digital differential analyzer 3 via an OR gate 10. The second input to AND gate 9 is a load control signal from a pulse source, not shown. Thus, during load, binary information representing $vc$ is fed directly to the digital differential analyzer 3.

Store register 6 has its output coupled to OR gate 10 and to an AND gate 8, via another AND gate 7. The other inputs of these AND gates are connected to a pulse source, not shown, which produces a "not load" function. Thus, during "not load," the digital $vc$ signal is recirculated in a loop consisting of register 6, and AND gates 7 and 8. This loop insures continuous input of $vc$ data to digital differential analyzer 3 until it is necessary to load in new $vc$ data.

The digital differential analyzers used in the present invention are standard circuit components manufactured by the Microelectronic Division of General Instrument Corporation, Hicksville, Long Island, New York, and identified as model MEM 5021. The complete digital differential analyzer includes two registers and an adder/subtractor as described in an article entitled MIOS Integrated Digital Differential Analyzer, by J. D. Callan, appearing in the Mar. 1967 edition of Microelectronics Application Notes.

For the purpose of the present explanation, a digital differential analyzer including both registers is termed a full digital differential analyzer while a digital differential analyzer without the two registers functions as an adder/subtractor only.

Figure 4:
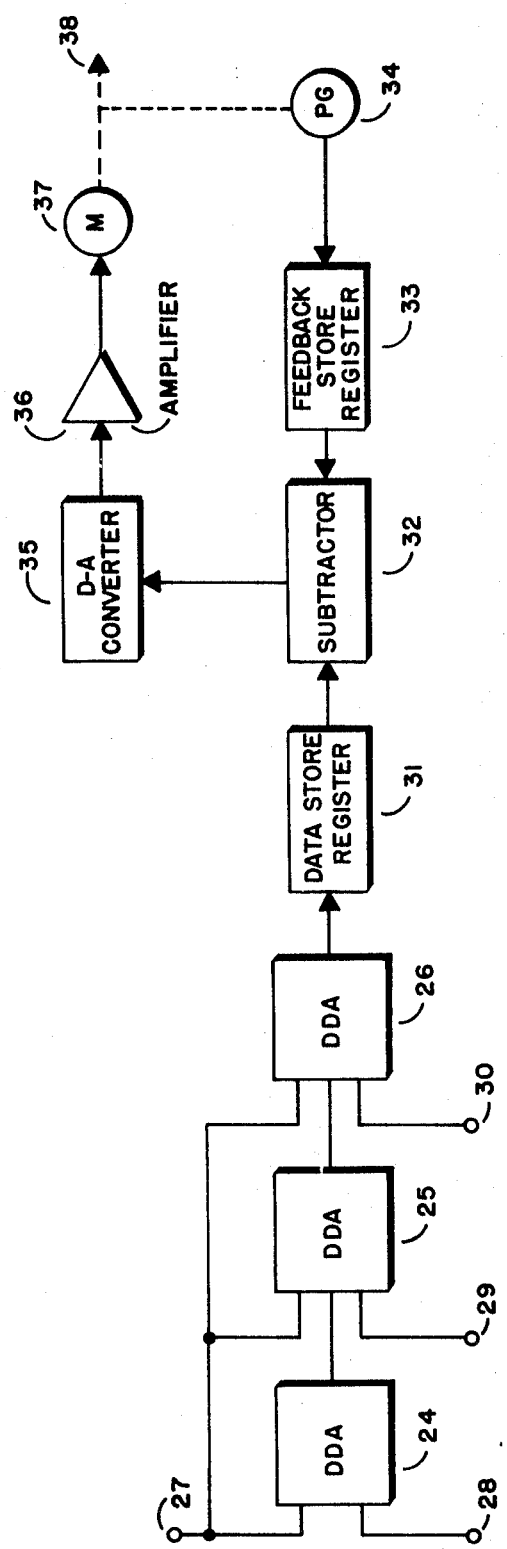

Digital differential analyzers 1 and 2 in FIGS. 3, and 24, 25 and 26 in FIG. 4 are full digital differential analyzers, while digital differential analyzer 3 omits the registers, and functions as a subtractor.

Digital differential analyzer 3 receives as inputs, the digital velocity command signal from OR gate 10, $vc$ and an output signal from a register of digital differential analyzer 2 which, as will be explained below, represents actual plotter velocity $v$. The output of digital differential analyzer 3 thus represents $v-vc$. This output is fed as an input to a digital differential analyzer 1 and to a servo adder/compare device 19. Device 19 detects the sign of the difference signal $v-vc$. If this sign is negative, $vc$ is greater than $v$ and an acceleration is required. If the sign is positive, $v$ is greater than $vc$ and a deceleration is required. Thus, depending on the sign, one or the other of output leads 43 is energized to control a digital differential analyzer 1 sign control circuit 20 which may be a conventional flip-flop circuit. Sign control 20 serves to energize either one of terminals 41 or 42 which energization produces a corresponding positive or negative time function at terminals 41' or 42' from a clock source, not shown.

A negative time function will produce an acceleration, while a positive time function will produce a deceleration. Of course, actual velocity could be subtracted from command velocity in digital differential analyzer 3 yielding a sign reversal for the acceleration and deceleration, described above.

Digital differential analyzer 1 receives as inputs, the positive or negative timing functions from terminals 41' or 42', the difference between the actual velocity and the command velocity from digital differential analyzer 3 as an initial condition, and feedback from the output of the digital differential analyzer 1 to its input. Digital differential analyzer 1 implements the following relation:

(160) $dv = (a_m/v_m)(v - v_c)dt$

The quantity $a_m/v_m$ is introduced as a weighting factor, block $k$; in the programming of the digital differential analyzer.

The output signal $dv$ is fed to a digital differential analyzer 2 via an OR gate 16 and two AND gates 14 and 15. The other input of AND gate 15 is connected to the output of a flip-flop circuit 23. Flip-flop 23 together with AND gate 22 and OR gate 21 constitute a control circuit which triggers AND gate 15 closed when command velocity $v_c$ equals actual velocity $v$. When these velocities are equal, neither of lines 43 produces any output; thus, OR gate 21 produces no output causing AND gate 22 to produce no output and, thereby, flip-flop 23 to change state. The second input of AND gate 22 is connected to the "not load" pulse source, not shown. Thus, during the "not load" condition, AND gate 22 receives at least one input. Flip-flop 23 is reset by a signal at reset terminal 49.

AND gate 14 is connected to an end of curve control circuit consisting of a flip-flop 13 and logical AND gates 11 and 12.

AND gate 11 receives as inputs a new curve flag signal from magnetic tape or computer 4 on terminal 46 and a flip-flop reset signal at terminal 48. AND gate 12 receives an end of curve flag from means 4 at terminal 45 and a load signal at terminal 47, from a pulse source, not shown.

Thus, flip-flop 13 will be reset to deenergize AND gate 14 by the output of AND gate 11 during the occurrence of the reset signal and the indication that a new curve or segment is commencing. AND gate 14 will be energized upon the occurrence of an end of curve signal at terminal 45.

Thus, the incremental velocity signal $dv$ will continue to pass from digital differential analyzer 1 to digital differential analyzer 2 until command velocity equals actual velocity, or an end of curve signal is received.

Digital differential analyzer 2 receives as inputs the incremental velocity signal $dv$ and a signal at terminal 40 representing time. The output of digital differential analyzer 2 is given by (161) $dz = \int dv\, dt$ or $dz = v\, dt$ Digital differential analyzer 2 contains the two registers necessary to construct a full integrator. The signal in the so-called Y register of digital differential analyzer 2 is the sum of the $dv$'s or $v$.

It is to be noted that the sign of $dv$, indicating acceleration or deceleration, from sign control source 20 serves to either increment or decrement the Y register of digital differential analyzer 2 which drives $v$ towards $vc$. Therefore, the rate of the output pulses representing $dz$ is directly proportional to the magnitude of $v$ in the Y register of digital differential analyzer 2. This output is fed to terminal 39 and to a down counter 17. Down counter 17 stores the computed value of $z$, the length of the segment, from the data buffers. This stored value of $z$ is decremented by $dz$ so that the desired length is indicated when the output of the down counter is zero.

Terminal 39 is connected to terminal 27, FIG. 4, thus feeding the $dz$ signal as an input to series connected digital differential analyzers 24, 25, and 26. The other inputs to these digital differential analyzers are the coefficients $cx$ at terminal 28, $bx$ at terminal 29, and $ax$ at terminal 30. These coefficients are stored in data buffers 5. The connection between buffers 5 and terminals 28–30 are not shown, to avoid complicating the drawing.

The output of digital differential analyzers 24–26 are, respectively: $cx\, dz$; $(bx+cxz)\, dz$; and $(ax+bxz+\frac{1}{2}cxz^2)\, dz$. The last expression, from equation (1), is equal to $dx$, the incremental distance in $x$ to be plotted.

The incremental signal, $dx$, is fed as an input to data store register 31 which sums the increments $dx$ to provide the commanded position $x$. The output of register 31 is coupled to a digital subtractor 32. Subtractor 32 takes the incremental difference between desired incremental position and actual position developed by feedback store register 33 and a pulse generator 34 which generates present position information. The digital difference constitutes an incremental error signal which is converted to analog form in digital to analog converter 35. This analog signal is amplified in a conventional amplifier 36 and is utilized to drive motor 37 which positions the $x$ plotter mechanism 38.

It will be understood that the structure of FIG. 4 is exactly duplicated to generate $y$ position movement.

Elements 31–37 constitute a hybrid servosystem which provides a smooth, continuous plotter motion from discrete position information. It will be understood that the hybrid servosystem operates on an incremental basis. That is, as soon as the signal in register 31 differs from that in register 33, an error signal at the output of subtractor 32 is generated.

Now that the principal embodiment of the invention has been described, it will be apparent that modifications may be made thereto without departing from the spirit or scope thereof. Thus, the scope of the invention is defined in the appended claims.

We claim:

1. A system for plotting digital data points comprising: means to compute optimum plotter velocity, distance between the data points, and the coefficients of polynomial equations for the data points; means connected to said computing means to receive said optimum velocity and to compare said optimum velocity with actual velocity; means connected to said comparison means to generate an accelerate or decelerate command signal; means to receive said accelerate or decelerate signal for incrementing or decrementing said actual velocity; means connected to receive said accelerate or decelerate signal to produce an incremental distance signal at a rate proportional to said actual velocity; means connected to receive said distance signal and to decrement said distance signal by said incremental distance signal; means connected to said computing means to receive said coefficients and said incremental distance signal and solve said polynomial equations at a rate proportional to the rate of said incremental distance signals for the time required to decrement said distance by said incremental distance: and, means to plot said solutions.

2. A plotting system for producing a continuous plot of data points in the form of digital signals employing an interpolating curve-fitting technique for generating the configuration of segments between data points, said system comprising:

a variable velocity plotting mechanism for plotting said data points and said segments;

computer means for producing first output signals representing coefficients of an interpolating curve for defining said segment, second output signals representing the velocity at which said segment is to be plotted, and third output signals representing the length of said segment to be plotted;

means connected to said computing means and to said plotting mechanism for producing a difference signal representing the sign and the magnitude of the difference between the velocity of said plotting mechanism and said second output signals;

means connected to receive said difference signal and said third output signal for producing a binary control signal whose pulse repetition rate is a function of said difference signal;

digital differential analyzer means connected to receive said first output signal, and said control signal for generating an output signal representing said segment at a rate proportional to said repetition rate; and means connecting said output signal to said plotting mechanism thereby producing a graphical plot of said segment.

3. A system for providing graphical plots of information points having the form of digital signals where curve fitting is employed to define the configuration of the portions of the plot between said points comprising:

a digital computer for producing, with respect to a predetermined portion of said plot, first curve-fitting output signals for defining said predetermined portion, a second output signal representing the speed at which said portion is to be plotted, and a third output signal representing the length of said portion;

comparison means connected to said computing means for receiving said second output signal for generating an incremental position signal having a pulse repetition rate functionally related to said second output signal;

control means connected to said computing means for receiving said third output signal, and to said comparison means for receiving said incremental position signal to control the production of said position signal as a function of said third output signal;

digital differential analyzer means connected to receive said first output signals and said incremental position signal for producing output signals defining said portion at a pulse repetition rate proportional to the pulse repetition rate of said position signal; and a plotting mechanism connected to said digital differential analyzer means for plotting said output signals.

4. A system for plotting digital data points employing curve fitting to plot segments between data points comprising:

means to compute, for a given segment, optimum plotter velocity, distance between the data points, and the coefficients of polynomial equations for said curve fit;

means connected to said computing means to receive said optimum velocity and to compare said optimum velocity with actual velocity;

means connected to said comparison means to generate an accelerate or decelerate command signal as a function of said comparison;

means to receive said accelerate or decelerate command signal for respectively incrementing or decrementing said actual velocity;

means connected to receive said accelerate or decelerate signal to produce an incremental distance signal having a pulse repetition rate proportional to said actual velocity;

means connected to said computer means to receive said distance signal for decrementing said distance signal by said incremental distance signal;

means connected to receive said coefficients for said curve fit and said incremental distance signal to solve said polynomial equations at a rate proportional to the pulse repetition rate of said incremental distance signal for the time required to decrement said distance by said incremental distance; and means to plot said solutions.

5. The system of claim 4 wherein said means for plotting said solutions includes a plotter mechanism and a hybrid servosystem for driving said mechanism, and said coefficient receiving means includes a plurality of digital differential analyzers connected in series, the output of said differential analyzers being connected to said hybrid servosystem.

6. The system of claim 5 wherein said plotter mechanism may be driven at a range of speeds and wherein said rate of solutions determines a speed within said range.

7. A plotting system for producing a graphical plot of data points in the form of digital signals, by employing an interpolating curve-fitting technique for generating the configuration of segments between data points, said system comprising:
computer means for producing first output signals representing coefficients of an interpolating curve for defining said segments, second output signals representing the velocity at which said segments are to be plotted, and third output signals representing the length of said segments to be plotted;
means connected to said computing means and to said plotting means for producing a difference signal representing the sign and the magnitude of the difference between the actual velocity of said plotting means and said second output signals;
means connected to receive said difference signal and said third output signals for producing, for each segment, a control signal whose pulse repetition rate is a function of said difference signal;
means connected to receive said first output signal and said control signals for generating, for each segment, a fourth signal representing said segment at a rate proportional to said repetition rate; and variable velocity plotting means for producing a graphical plot of said fourth signal.

8. The plotting system of claim 7 further including a hybrid servosystem connected to said plotting means for moving said plotting means in a continuous manner in response to said fourth signal.

9. The plotting system of claim 7 wherein said fourth signal generating means includes a plurality of serially connected digital differential analyzers.

10. The method of producing a continuous graphical plot of data points in the form of discontinuous electrical signals employing interpolating curve fitting for generating the configuration of the plot between data points comprising the steps of utilizing computer means for generating from said data points first discontinuous electrical signals representing the coefficients of an interpolating curve for defining the configuration of a plot between said data points; second discontinuous electrical signals representing the velocity at which said configuration is to be plotted; and third discontinuous electrical signals representing the length of said configuration;
generating a fourth discontinuous electrical signal representing the difference between the actual velocity of a plotting means and said second electrical signal,
generating a fifth discontinuous electrical signal having a pulse repetition rate proportional to the magnitude of said fourth electrical signal;
utilizing said first electrical and said fifth signal to generate a further electrical signal representing said configuration, at a rate proportional to said repetition rate; and plotting said further electrical signal on said plotting means.